US009484065B2

(12) United States Patent
McDowell et al.

(10) Patent No.: US 9,484,065 B2
(45) Date of Patent: Nov. 1, 2016

(54) INTELLIGENT DETERMINATION OF REPLAYS BASED ON EVENT IDENTIFICATION

(75) Inventors: Brian McDowell, Woodinville, WA (US); Owen Paulus, Kirkland, WA (US); David Jurenka, Kirkland, WA (US); Ivann Alvarado, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 12/905,880

(22) Filed: Oct. 15, 2010

(65) Prior Publication Data

US 2012/0093481 A1   Apr. 19, 2012

(51) Int. Cl.
| | |
|---|---|
| *H04N 5/92* | (2006.01) |
| *G11B 27/32* | (2006.01) |
| *G11B 27/10* | (2006.01) |
| *G11B 27/28* | (2006.01) |
| *H04N 21/845* | (2011.01) |

(Continued)

(52) U.S. Cl.
CPC .......... *G11B 27/322* (2013.01); *G11B 27/105* (2013.01); *G11B 27/28* (2013.01); *H04N 21/44218* (2013.01); *H04N 21/8455* (2013.01); *H04N 21/8549* (2013.01)

(58) Field of Classification Search
CPC ... G11B 27/105; G11B 27/28; G11B 27/322; H04N 21/8549; H04N 21/8455; H04N 21/44218
USPC ......................................................... 386/241
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |

(Continued)

FOREIGN PATENT DOCUMENTS

| | | |
|---|---|---|
| CN | 1783998 A | 6/2006 |
| CN | 101490762 A | 7/2009 |

(Continued)

OTHER PUBLICATIONS

Toyama, et al., "Probabilistic Tracking in a Metric Space," Eighth International Conference on Computer Vision, Vancouver, Canada, vol. 2, Jul. 2001, 8 pages.

(Continued)

*Primary Examiner* — William Tran
(74) *Attorney, Agent, or Firm* — Gregg Wisdom; Judy Yee; Micky Minhas

(57) ABSTRACT

A system for intelligently determining replay locations in a multimedia content stream based on identifying events in the multimedia content stream is provided. In one embodiment, events in the multimedia content stream are identified by analyzing information in the multimedia content stream, in real time. In another embodiment, events in the multimedia content stream are identified by analyzing the viewing behavior and an emotional response from users viewing the multimedia content, in real time. One or more replay locations in the multimedia content stream are determined based on the events identified in the multimedia content stream. The multimedia content stream with the replay locations are displayed to a user via a user interface in the user's processing device.

11 Claims, 13 Drawing Sheets

(51) Int. Cl.
 *H04N 21/442* (2011.01)
 *H04N 21/8549* (2011.01)

(56) References Cited

U.S. PATENT DOCUMENTS

| | | |
|---|---|---|
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,112,186 A | 8/2000 | Bergh et al. |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,243,104 B1 | 6/2001 | Murray |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,699,127 B1 | 3/2004 | Lobb et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,710 B1 | 3/2005 | Cohen-Solal et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,028,269 B1 | 4/2006 | Cohen-Solal et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,076,741 B2 | 7/2006 | Miyaki |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |

(56) References Cited

U.S. PATENT DOCUMENTS

| | | | |
|---|---|---|---|
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,624,416 B1 | 11/2009 | Vandermolen et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2002/0062481 A1 | 5/2002 | Slaney et al. | |
| 2002/0091568 A1 | 7/2002 | Kraft et al. | |
| 2003/0078784 A1 | 4/2003 | Jordan et al. | |
| 2003/0093784 A1* | 5/2003 | Dimitrova et al. | 725/10 |
| 2003/0097408 A1 | 5/2003 | Kageyama et al. | |
| 2003/0118974 A1* | 6/2003 | Obrador | 434/236 |
| 2003/0156134 A1 | 8/2003 | Kim | |
| 2003/0237093 A1 | 12/2003 | Marsh | |
| 2004/0030599 A1* | 2/2004 | Sie et al. | 705/14 |
| 2004/0100088 A1 | 5/2004 | Tellenbach et al. | |
| 2004/0193425 A1 | 9/2004 | Tomes | |
| 2005/0004930 A1* | 1/2005 | Hatta | 707/102 |
| 2005/0091680 A1 | 4/2005 | Kondo | |
| 2005/0285966 A1 | 12/2005 | Bamji et al. | |
| 2007/0050242 A1 | 3/2007 | Kralik | |
| 2007/0061022 A1 | 3/2007 | Hoffberg-Borghesani et al. | |
| 2007/0078708 A1 | 4/2007 | Yu et al. | |
| 2007/0078709 A1 | 4/2007 | Rajaram | |
| 2007/0112837 A1* | 5/2007 | Houh et al. | 707/102 |
| 2007/0157237 A1 | 7/2007 | Cordray et al. | |
| 2007/0167689 A1 | 7/2007 | Ramadas et al. | |
| 2007/0171286 A1 | 7/2007 | Ishii et al. | |
| 2007/0214471 A1 | 9/2007 | Rosenberg | |
| 2007/0243930 A1 | 10/2007 | Zalewski et al. | |
| 2007/0250901 A1* | 10/2007 | McIntire et al. | 725/146 |
| 2008/0004959 A1 | 1/2008 | Tunguz-Zawislak et al. | |
| 2008/0026838 A1 | 1/2008 | Dunstan et al. | |
| 2008/0030621 A1 | 2/2008 | Ciudad et al. | |
| 2008/0033826 A1 | 2/2008 | Maislos et al. | |
| 2008/0077952 A1 | 3/2008 | St. Jean et al. | |
| 2008/0102947 A1 | 5/2008 | Hays et al. | |
| 2008/0120112 A1 | 5/2008 | Jordan et al. | |
| 2008/0147501 A1 | 6/2008 | Gilliam | |
| 2008/0204450 A1 | 8/2008 | Dawson et al. | |
| 2008/0262909 A1 | 10/2008 | Li et al. | |
| 2009/0059175 A1 | 3/2009 | Le Quesne et al. | |
| 2009/0089837 A1* | 4/2009 | Momosaki | 725/40 |
| 2009/0118002 A1 | 5/2009 | Lyons et al. | |
| 2009/0158170 A1 | 6/2009 | Narayanan et al. | |
| 2009/0195392 A1 | 8/2009 | Zalewski | |
| 2009/0199235 A1 | 8/2009 | Surendran et al. | |
| 2009/0217315 A1 | 8/2009 | Malik et al. | |
| 2009/0248505 A1 | 10/2009 | Finkelstein et al. | |
| 2009/0249387 A1* | 10/2009 | Magdy et al. | 725/32 |
| 2009/0271417 A1* | 10/2009 | Toebes et al. | 707/100 |
| 2009/0285545 A1* | 11/2009 | Bon | 386/68 |
| 2009/0299843 A1 | 12/2009 | Shkedi | |
| 2009/0325661 A1 | 12/2009 | Gross | |
| 2009/0327073 A1 | 12/2009 | Li et al. | |
| 2009/0328087 A1 | 12/2009 | Higgins et al. | |
| 2010/0043040 A1 | 2/2010 | Olsen, Jr. | |
| 2010/0070987 A1* | 3/2010 | Amento et al. | 725/10 |
| 2010/0071013 A1 | 3/2010 | Vandermolen et al. | |
| 2010/0086204 A1 | 4/2010 | Lessing | |
| 2010/0145797 A1 | 6/2010 | Hamilton, II et al. | |
| 2010/0205562 A1 | 8/2010 | de Heer | |
| 2011/0063440 A1* | 3/2011 | Neustaedter et al. | 348/143 |
| 2011/0106375 A1 | 5/2011 | Sundaram | |
| 2011/0118858 A1* | 5/2011 | Rottler et al. | 700/94 |
| 2011/0169959 A1* | 7/2011 | DeAngelis et al. | 348/157 |
| 2012/0077574 A1 | 3/2012 | Walker et al. | |
| 2012/0124604 A1 | 5/2012 | Small et al. | |

FOREIGN PATENT DOCUMENTS

| | | |
|---|---|---|
| CN | 101254344 B | 6/2010 |
| CN | 102214225 A | 10/2011 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2009079560 A1 | 6/2009 |

OTHER PUBLICATIONS

Ng, et al., "Collages as Dynamic Summaries of Mined Video Content for Intelligent Multimedia Knowledge Management," Carnegie Mellon University, Computer Science Dept., [http://www.informedia.cs.cmu.edu/documents/aaai03_ng.pdf], Mar. 24-26, 2003, 10 pages.

Graham, et al., "The Video Paper Multimedia Playback System," Ricoh Innovations, Inc., [http://www.rii.ricoh.com/~jame/acm-mm-2003-videopaper.pdf], Nov. 2-8, 2003, 2 pages.

Correia, et al., "HyperMem: A System to Store and Replay Experiences in Mixed Reality Worlds," Proceedings of the 2005 International Conference on Cyberworlds (CW '05), IEEE Computer Society, Nov. 23-25, 2005, 8 pages.

Brundell, et al., "The Experience of Using Digital Replay System for Social Science Research," [http://www.mrl.nott.ac.uk/~axc/DReSS_Outputs/ICeSS_2_2008.pdf], Retrieved Jul. 6, 2010.

Correia, et al., "Storing and Replaying Experiences in Mixed Environments using Hypermedia," [http://74.125.155.132/scholar?q=cache:7nVs3h_o7awJ:scholar.google.com/+video+%2B+content+marker+%2B+point+of+interest+%2B+playback&hl=en&as_sdt=2000], Retrieved Jul. 6, 2010.

Owyang, "Contextual Ads Based Off Social Network Profile: Twitter and Facebook", Web Strategy [online], Jun. 18, 2009 [retrieved on Jun. 22, 2010], Retrieved from the Internet: <URL: http://www.web-strategist.com/blog/2009/06/18/contextual-ads-based-off-social-network-profile-twitter-and-facebook/>, 10 pages.

Hsieh, et al., "Personalized Advertising Strategy for Integrated Social Networking Websites", IEEE/WIC/ACM International Conference on Web Intelligence and Intelligent Agent Technology, Dec. 2008, pp. 369-372, IEEE Computer Society Washington, DC, USA, 4 pages.

Kim, "IAB Social Advertising Best Practices", The IAB User-Generated Content & Social Media Committee, May 2009, [online], [retrieved on Jun. 22, 2010] Retrieved from the Social Media of IAB using Internet ,<URL: http://www.iab.net/media/file/Social-Advertising-Best-Practices-0509.pdf>, 19 pages.

"Audio Advertisement Recognition." SIGNALogic [online]. Retrieved from the Internet on Sep. 8, 2010: URL:<http://www.signalogic.com/index.pl?page=ad_recog>, 2 pages.

Seles, Sheila Murphy, "Audience Research for Fun and Profit: Rediscovering the Value of Television Audiences", Submitted to the program in Comparative Media Studies, Jun. 2010, 128 pages, Massachusetts Institute of Technology.

(56) References Cited

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, pp. 90-102, University of Texas at Austin, Austin, TX.

Shao et al., "An Open System Architecture for a Multimedia and Multimodal User Interface", Aug. 24, 1998, 8 pages, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, 35 pages, Germany.

Hasegawa et al., "Human-Scale Haptic Interaction with a Reactive Virtual Human in a Real-Time Physics Simulator", Jul. 2006, 12 pages, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, 121 pages, The Robotics Institute, Carnegie Mellon University, Pittsburgh, PA.

He, "Generation of Human Body Models", Apr. 2005, 111 pages, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, 145 pages, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, pp. 602-605, vol. 15, No. 6, IEEE Transactions on Pattern Analysis and Machine Intelligence.

Granieri et al., "Simulating Humans in VR", The British Computer Society, Oct. 1994, pp. 1-4, 6-9, 12, 15-16, and 18-21 (15 pages) Academic Press.

Brogan et al., "Dynamically Simulated Characters in Virtual Environments", Sep./Oct. 1998, pp. 58-69, vol. 18, Issue 5, IEEE Computer Graphics and Applications.

Fisher et al., "Virtual Environment Display System", ACM Workshop on Interactive 3D Graphics, Oct. 1986, 12 pages, Chapel Hill, NC.

"Virtual High Anxiety", Tech Update, Aug. 1995, pp. 22.

Sheridan et al., "Virtual Reality Check", Technology Review, Oct. 1993, pp. 21-28, vol. 96, No. 7.

Stevens, "Flights into Virtual Reality Treating Real-World Disorders", The Washington Post, Mar. 27, 1995, Science Psychology, 2 pages.

"Simulation and Training", 1994, 6 pages, HP Division Incorporated.

English Machine-translation of Japanese Publication No. JP08-044490 published on Feb. 16, 1996.

Office Action dated Nov. 6, 2012 in U.S. Appl. No. 12/945,691, 55 pages.

Response to Office Action filed Feb. 6, 2013 in U.S. Appl. No. 12/945,691, 12 pages.

Office Action dated Apr. 4, 2013 in U.S. Appl. No. 12/945,691, 33 pages.

Response to Final Office Action filed on Sep. 4, 2013 in U.S. Appl. No. 12/945,691, 12 pages.

Notice of Allowance dated Oct. 23, 2013 2013 in U.S. Appl. No. 12/945,691, 43 pages.

Office Action dated Feb. 14, 2014 with Partial English Language Translation in Chinese Patent Application No. 201110321255.4, 14 pages.

Response to Office Action filed Jun. 18, 2014 in Chinese Patent Application No. 201110321255.4, with English Summary of the Office Action, Response and Amended Claims, 21 pages.

Office Action dated Jul. 15, 2014 in Chinese Patent Application No. 201110321255.4, with Partial English Language Translation and Summary of the Office Action, 10 pages.

English Abstract of CN101490762 published Jul. 22, 2009, 3 pages.

\* cited by examiner

INTELLIGENT DETERMINATION OF REPLAYS BASED ON EVENT IDENTIFICATION

BACKGROUND

Digital video recorders deliver video, motion graphics, audio, and other multimedia content on displays such as televisions, monitors or mobile computing devices. A user viewing multimedia content on the display can typically access different parts of the multimedia content by utilizing one or more controls in the digital video recorder. For example, a user may utilize a replay control in the digital video recorder to re-watch a segment of a video or audio recording. Replaying a recorded segment typically involves changing the user's current viewing position to some time prior to the current viewing position in the multimedia content stream. This time is usually arbitrary and fixed and typically does not reflect the user's true intent, resulting in the user having to re-watch content that the user had no intention of watching again. The user may have to utilize a combination of other media device controls such as a fast forward control or a rewind control to manually determine the viewing position in the multimedia content stream that the user actually intended to re-watch.

SUMMARY

Disclosed herein is a method and system which performs the intelligent determination of replay locations in a multimedia content stream by identifying events in the multimedia content stream. An event is an interesting occurrence in the multimedia content stream that a viewer may wish to replay at a future time. In one embodiment, events in the multimedia content stream are identified by analyzing information in the multimedia content stream, in real time. In one example, an event is identified by detecting audio or visual cues in the multimedia content stream. The cues may include, for example, applause, a cheer, a remark, a score update or a commentary update from one or more entities in an audio or video sequence in the multimedia content stream. In another embodiment, an event in the multimedia content stream is identified based on user-feedback information received from users viewing the multimedia content. For example, an event may be identified based on a user's viewing behavior by monitoring one or more controls utilized by the user while viewing the multimedia content. An event in the multimedia content stream may also be identified based on a user's emotional response to the multimedia content by tracking the user's facial expressions, vocal responses, gestures and movements using a visual detection or motion tracking device. Replay locations in the multimedia content stream are determined based on the identified events. The multimedia content stream with the replay locations is delivered to the user. The user may re-watch one or more of the identified events in the multimedia content stream from one or more of the replay locations. The multimedia content stream is displayed to the user, via a user interface in the user's processing device.

In one embodiment, a method for determining one or more replay locations in a multimedia content stream is disclosed. The method includes receiving a multimedia content stream related to a current broadcast. The method then includes analyzing the multimedia content stream in real time to identify one or more events in the multimedia content stream and determining one or more replay locations in the multimedia content stream based on the events. In one embodiment, the method includes receiving an input from one or more users to replay the multimedia content stream. The method then includes displaying a portion of the multimedia content stream from one or more of the replay locations to the users.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Technology is disclosed which provides a system and a method for intelligently determining replay locations in a multimedia content stream based on identifying events in the multimedia content stream is disclosed. An event is an interesting occurrence in the multimedia content stream that a viewer may wish to replay at a future time. For example, events in a multimedia content stream corresponding to a football game may include touchdowns, big plays, goals, free kicks and so forth. In one embodiment, the identification of events in the multimedia content stream and the determination of replay locations based on the identified events may be performed automatically by analyzing information in the multimedia content stream or by analyzing user-feedback information received from one or more users, in real time. In another embodiment, the identification of events in the multimedia content stream and the determination of replay locations based on the identified events may be performed manually. The multimedia content stream with one or more replay locations is provided to one or more users. A user may re-watch an identified event in the multimedia content stream from one or more of the replay locations, via a user interface in the user's processing device.

Figure 1:
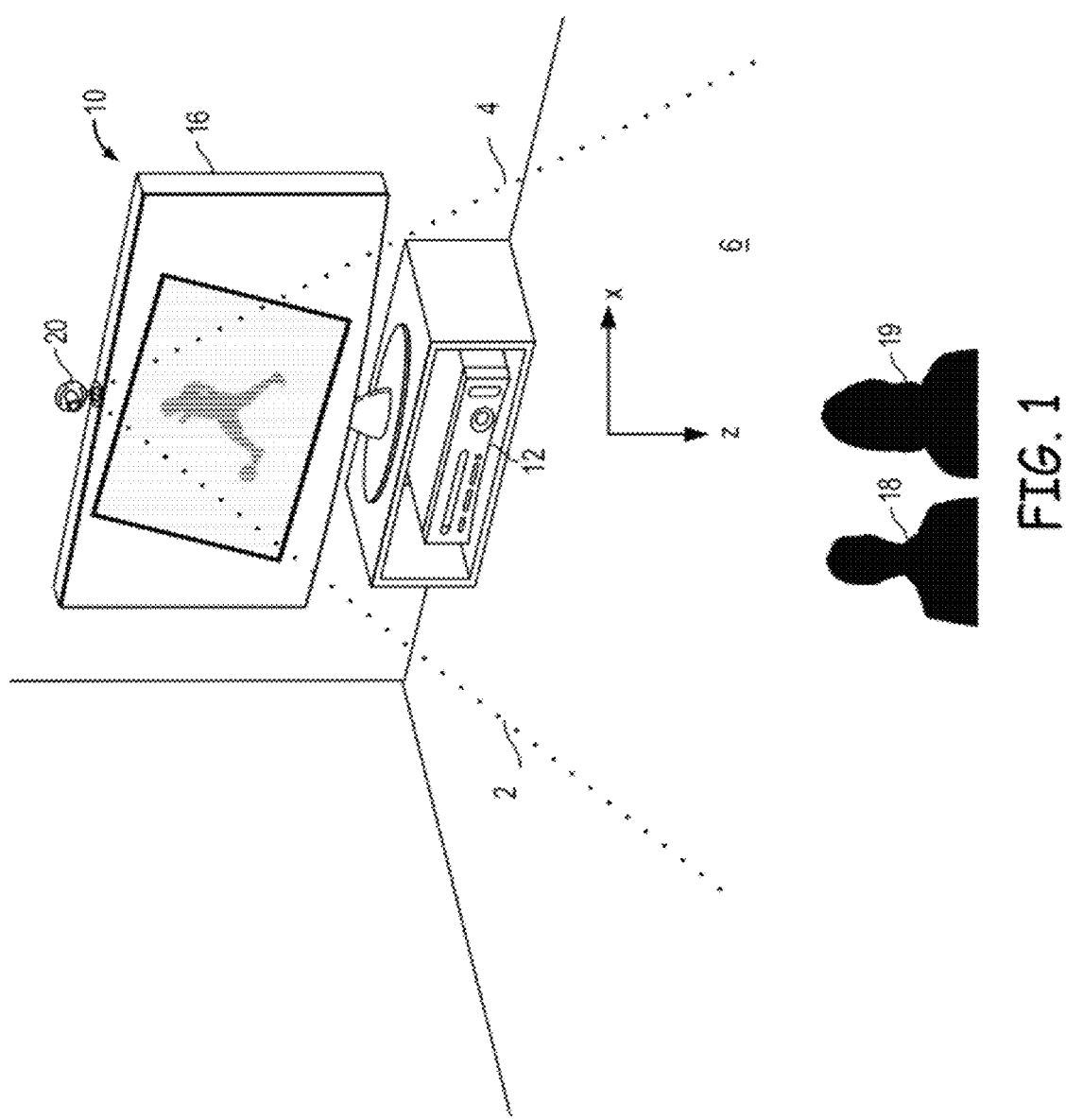
FIG. 1 illustrates one embodiment of a target recognition, analysis and tracking system for performing the operations of the disclosed technology.

FIG. 1 illustrates one embodiment of a target recognition, analysis and tracking system 10 (generally referred to as a motion tracking system hereinafter) for performing the operations of the disclosed technology. The target recognition, analysis and tracking system 10 may be used to recognize, analyze, and/or track one or more human targets such as users 18 and 19. As shown in FIG. 1, the tracking system 10 may include a computing device 12. In one embodiment, computing device 12 may be implemented as any one or a combination of a wired and/or wireless device, as any form of television client device (e.g., television set-top box, digital video recorder (DVR), etc.), digital media device, personal computer, portable computer device, mobile computing device, communication device, video processing and/or rendering device, appliance device, gaming device, electronic device, and/or as any other type of device that can be implemented to receive media content in any form of audio, video, and/or image data. According to one embodiment, the computing device 12 may include hardware components and/or software components such that the computing device 12 may be used to execute applications such as gaming applications, non-gaming applications, or the like. In one embodiment, computing device 12 may include a processor such as a standardized processor, a specialized processor, a microprocessor, or the like that may execute instructions stored on a processor readable storage device for performing the processes described herein.

As shown in FIG. 1, the tracking system 10 may further include a capture device 20. The capture device 20 may be, for example, a camera that may be used to visually monitor one or more users, such as users 18 and 19, in a field of view, 6, such that movements, gestures and audio responses from the users may be captured and tracked by the capture device 20. Lines 2 and 4 denote a boundary of the field of view, 6.

According to one embodiment, computing device 12 may be connected to an audiovisual device 16 such as a television, a monitor, a high-definition television (HDTV), or the like that may provide visuals and/or audio to users 18 and 19. For example, the computing device 12 may include a video adapter such as a graphics card and/or an audio adapter such as a sound card that may provide the audiovisual signals to an output device. The audiovisual device 16 may receive the audiovisual signals from the computing device 12 and may output visuals and/or audio associated with the audiovisual signals to users 18 and 19. According to one embodiment, the audiovisual device 16 may be connected to the computing device 12 via, for example, an S-Video cable, a coaxial cable, an HDMI cable, a DVI cable, a VGA cable, or the like.

In one embodiment, computing device 12 receives a multimedia content stream from a remote computing system and provides the multimedia content stream to one or more users, via the audiovisual device 16. The multimedia content stream can include any type of audio, video, and/or image media content received from media content sources such as content providers, broadband, satellite and cable companies, advertising agencies the internet or a web server. As described herein, the multimedia content stream can include recorded video content, video-on-demand content, television content, television programs, advertisements, commercials, music, movies, video clips, and other on-demand media content. The multimedia content stream can also include interactive games, network-based applications, and any other content or data (e.g., program guide application data, user interface data, advertising content, closed captions, content metadata, search results and/or recommendations, etc.). The operations performed by the computing device 12 are discussed in detail below.

Figure 2A:
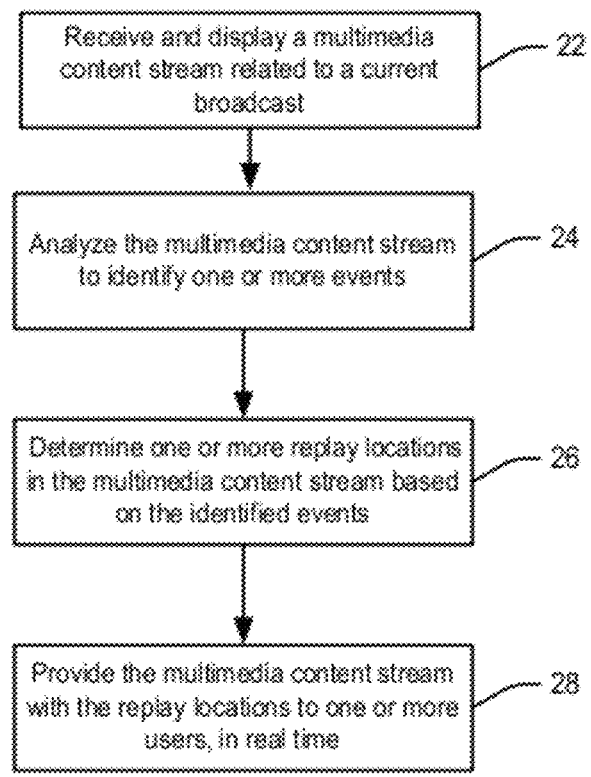
FIG. 2A is a flowchart describing one embodiment of a process for performing the intelligent determination of replay locations in a multimedia content stream by identifying events in the multimedia content stream.

FIG. 2A is a flowchart describing one embodiment of a process for performing the intelligent determination of replay locations in a multimedia content stream by identifying events in the multimedia content stream. In step 22, a multimedia content stream associated with a current broadcast is received. As discussed in FIG. 1, the multimedia content stream can include recorded video content, video-on-demand content, television content, television programs, advertisements, commercials, music, movies, video clips, and other on-demand media content. In one embodiment, the multimedia content stream may be displayed to users 18, 19 at computing device 12. For example, the multimedia content stream may be displayed to the users, via audiovisual device 16 connected to computing device 12.

In step 24, the multimedia content stream is analyzed to identify one or more events in the multimedia content stream. As described herein, an event is an interesting occurrence in the multimedia content stream that a viewer may wish to replay at a future time. In one approach, the step 24 of identifying events in the multimedia content stream includes automatically analyzing information in the multimedia content stream. For example, an event may be identified by detecting audio or visual cues such as applause, a cheer, a remark, a score update or a commentary update in the multimedia content stream. In another approach, the step 24 of identifying events in the multimedia content stream includes automatically analyzing user-feedback information received from one or more users. For example, an event may be identified based on a user's viewing behavior by monitoring one or more controls utilized by the user while viewing the multimedia content. An event in the multimedia content stream may also be identified based on a user's emotional response to the multimedia content by tracking the user's facial expressions, vocal responses, gestures and movements using a visual detection or motion tracking device (as shown in FIG. 1).

Figure 8:
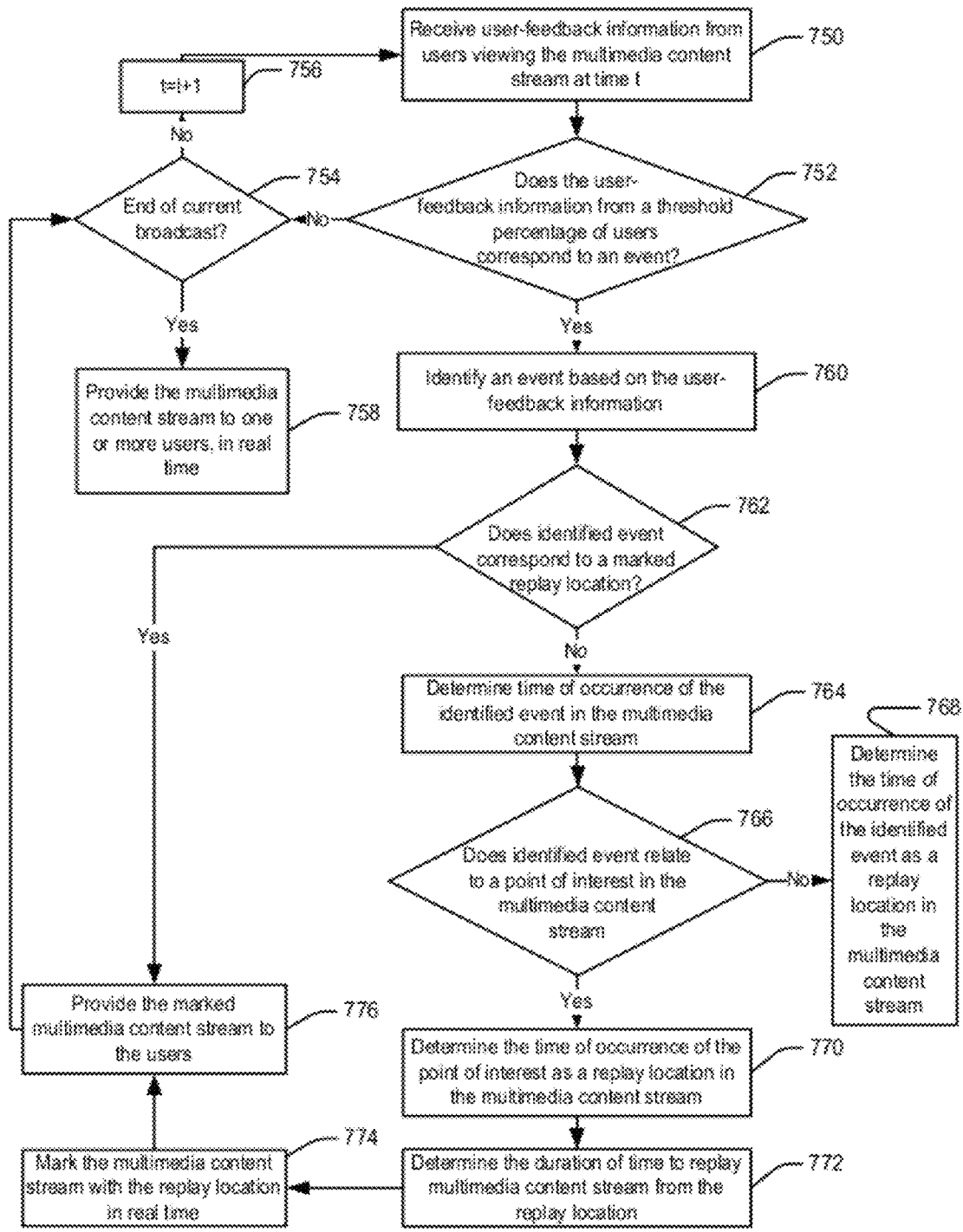
FIG. 8 describes another embodiment of a process by which a replay location in a multimedia content stream may be determined.

In step 26, one or more replay locations in the multimedia content stream are determined based on the identified events. FIG. 8 describes a process by which a replay location in a multimedia content stream can be determined automatically by analyzing information in multimedia content stream. FIG. 9 describes a process by which a replay location in a multimedia content stream can be determined automatically by analyzing user-specific information received from one or more users.

Figure 2B:
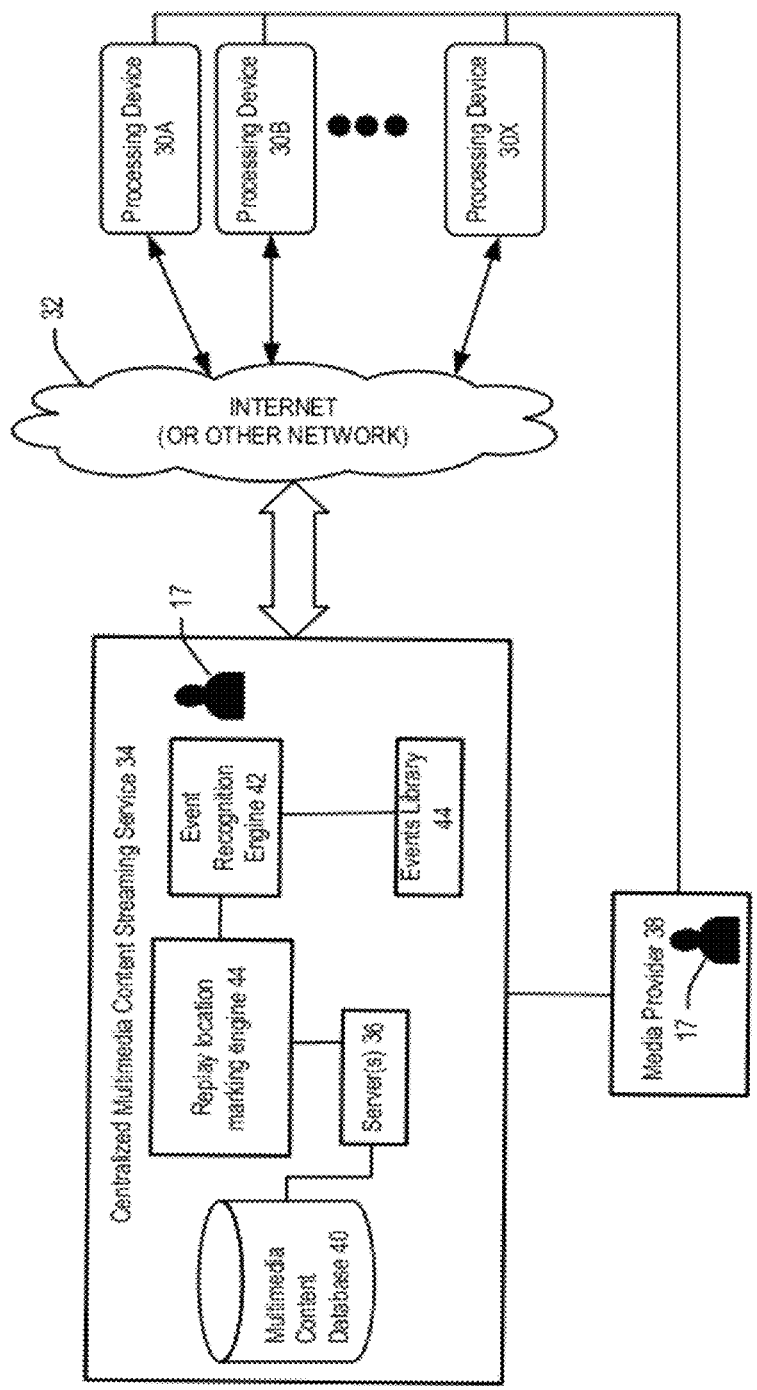
FIG. 2B illustrates a system for implementing the present technology.

In another approach, the identification of events in the multimedia content stream and the determination of replay locations based on the identified events may also be performed manually. FIG. 2B describes a system for performing the intelligent identification of replay locations in a multimedia content stream, based on the above mentioned approaches in more detail.

In step 28, the multimedia content stream with one or more replay locations is provided to the users. In one embodiment, and as discussed in detail in FIG. 2B, the multimedia content stream is marked with one or more replay locations by embedding information about the replay locations into a metadata stream associated with the multimedia content stream.

FIG. 2B illustrates a system for implementing the present technology. FIG. 2B illustrates multiple processing devices 30A, 30B . . . 30X that are coupled to a network 32 and can communicate with a remote computing system. Processing devices 30A, 30B . . . 30X can include the computing device 12 discussed in FIG. 1 or may be implemented as any of the devices described in FIGS. 3-6. For example, processing devices 30A, 30B . . . 30X may include a gaming and media console, a personal computer, or a mobile device such as a cell phone, a web-enabled smart phone, a personal digital assistant, a palmtop computer or a laptop computer. In one embodiment, the remote computing system is a centralized multimedia content streaming service 34. The centralized multimedia content streaming service 34 manages the storage and distribution of multimedia content to processing devices 30A, 30B . . . 30X. Network 32 may comprise the Internet, though other networks such as LAN or WAN are contemplated.

Centralized multimedia content streaming service 34 may include one or more server(s) 36 capable of receiving information from and transmitting information to processing devices 30A, 30B . . . 30X and provides a collection of services that applications running on processing devices 30A, 30B . . . 30X may invoke and utilize. For example, server(s) 36 in the centralized multimedia content streaming service 34 may manage a plurality of activities concurrently by aggregating information from users executing one or more game or non-game applications 80 (shown in FIG. 3) in the processing devices, 30A, 30B . . . 30X. Centralized multimedia content streaming service 34 may also include a multimedia content database 40 for storing multimedia content streams received from a media provider 38. Media provider 38 can include, for example, any entity such as a content provider, a broadband provider or a third party provider that can create structure and deliver multimedia content to the centralized multimedia content streaming service 34. As discussed above, multimedia content can include recorded video content, video-on-demand content, television content, television programs, advertisements, commercials, music, movies, video clips, and other on-demand media content. In one embodiment, centralized multimedia content streaming service 34 receives a multi-media content stream associated with a current broadcast (which may be a live, on-demand or pre-recorded broadcast) from the content provider 38 and provides the multimedia content stream to one or more users at processing devices 30A, 30B . . . 30X, in real-time.

As will be discussed in detail below, in one approach, centralized multimedia content streaming service 34 may analyze the multimedia content stream and provide the result of the analysis to all users/viewers of the multimedia content stream at processing devices 30A, 30B . . . 30X. Alternatively, the analysis of the multimedia content stream may also be performed by each of the individual processing devices 30A, 30B . . . 30X. In another approach, individual processing devices 30A, 30B . . . 30X may collect user-feedback information received from users at the processing devices and then provide the user-feedback information to the centralized multimedia content streaming service 34 for further analysis.

In one embodiment, centralized multimedia content streaming service 34 analyses the multimedia content stream to identify events in the multimedia content stream, perform the intelligent determination of replay locations based on the identified events and provide the multimedia content stream with the replay locations to the users at processing devices 30A, 30B . . . 30X, all in real-time. In one approach, the identification of events in the multimedia content stream and the determination of replay locations based on the identified events may be performed automatically by one or more software modules such as an event recognition engine 42 and a replay location marking engine 44 in the centralized multimedia content streaming service 34 by analyzing information in the multimedia content stream or by analyzing user-feedback information received from one or more users at one or more processing devices 30A, 30B . . . 30X. In another approach, the identification of events in the multimedia content stream and the determination of replay locations based on the identified events may be performed manually by a production person 17 who may be a part of the current or live broadcast at the centralized multimedia content streaming service 34 or at the media provider 38. The operations performed by the centralized multimedia content streaming service 34 are discussed in detail below.

As illustrated in FIG. 2B, centralized multimedia content streaming service 34 includes an event recognition engine 42 and a replay location marking engine 44. In one embodiment, event recognition engine 42 identifies events in the multimedia content stream by analyzing information in the multimedia content stream. As discussed above, an event is an interesting occurrence in the multimedia content stream that a viewer may wish to replay at a future time. For example, events in a multimedia content stream corresponding to a football game may include touchdowns, big plays, goals, free kicks and so forth. Event recognition engine 42 identifies one or more events in the multimedia content stream by comparing information in the multimedia content stream to one or more events in an events library 44 in the event recognition engine 42. Events library 44 may include a collection of events, comprising information concerning an event in the multimedia content stream.

In another embodiment, event recognition engine 42 also identifies one or more events in the multimedia content stream by analyzing user-feedback information received from users at processing devices, 30A, 30B . . . 30X. User-feedback information may be generated by processing devices, 30A, 30B . . . 30X. The manner in which user-feedback information is generated by processing devices 30A, 30B . . . 30X is discussed in detail in FIG. 3. In one embodiment, user-feedback information may include information about a user's viewing behavior. Information about a user's viewing behavior may include, for example, one or more controls utilized by the user on a processing device, such as a pause, forward, rewind, jump or a stop control while viewing multimedia content via the processing device. In another embodiment, user-feedback information may include information about a user's emotional response to the multimedia content viewed by the user. Information about a user's emotional response may include facial expressions, vocal responses, gestures or movements performed by the user while a user views multimedia content. Facial expressions may include, for example, smiles, laughter, cries, frowns, yawns or applauses from the user while the user views the multimedia content. Vocal responses may include sounds of laughter or applause associated with a facial expression. Gestures and movements may include a user's movement away from a field of view, a user facing the audiovisual device, leaning forward, or talking to the audio visual device while viewing the multimedia content.

User-feedback information may also include specific actions obtained from a user such as the user's vote while viewing multimedia content via the user's processing device. User-feedback information may also include information obtained from user-interface interaction performed by the user or based on the user's interaction with an input device such as a controller, remote control, mouse or keyboard connected to the user's processing device. For example, the user may interact with an application executing in the user's processing device via a user interface to manually specify points of interest or events while viewing multimedia content via the user's processing device.

In one embodiment, event recognition engine 42 identifies one or more events in the multimedia content stream by comparing the user-feedback information received from processing devices 30A, 30B . . . 30X to one or more events in the events library 44 in the event recognition engine 42. Events library 44 may also include a collection of events, comprising information concerning events related to user-specific information. For example, an event may be identified based on viewing behavior information such as one or more controls utilized by the user while viewing the multimedia content. An event may also be identified based on emotional response information such as the user's facial expressions, vocal responses, gestures and movements while viewing the multimedia content. In one embodiment, event recognition engine 42 may determine if the user-specific feedback information from a threshold percentage of users corresponds to a recognized event in the events library 44. The threshold percentage may be pre-determined by the event recognition engine 42, in one embodiment. For example, if the event recognition engine 42 receives user-feedback information that includes an emotional response of "no reaction" from 20% of the users and an emotional response of "applause" from 80% of the users while viewing the multimedia content during a specific time interval, the event recognition engine 42 may identify that the user-feedback information corresponds to an event such as a recognized player's entry into the field that occurred at a specific point in time in the multimedia content stream. Or, for example, if the event recognition engine 42 receives user-feedback information that includes a "rewind action" to a specific point in time in the multimedia content stream from 80% of the users viewing the multimedia content stream and "no action" from 20% of the users, the event recognition engine 42 may identify that the user-feedback information corresponds to a touchdown event that occurred at a specific point in time in the multimedia content stream.

In one embodiment, event recognition engine 42 provides the identified event, and the time of occurrence of the identified event to a replay location marking engine 44 for further analysis. Replay location marking engine 44 performs the intelligent determination of replay locations in the multimedia content stream based on the events identified by the event recognition engine 42. In one embodiment, replay location marking engine 44 may use the time of occurrence of the identified event as a replay location in the multimedia content. In another embodiment, replay location marking engine 44 may use some other point of interest related to the identified event as a replay location in the multimedia content stream. In one example, the point of interest may be identified by determining if the identified event was caused by a cue, such as the start of motion of a sports play at a point in time prior to the identified event in the multimedia content stream. For example, if the multimedia content stream comprises sports content, and the event identified is a "touchdown" event, the replay location marking engine 44 may determine that the "touchdown" event relates to a point of interest in the multimedia data stream where a recognized player enters the game, and may determine the time of occurrence of the point of interest the duration of the point of interest or the type of the point of interest as a replay location in the multimedia content stream.

Upon identification of the replay location, replay location marking engine 44 also determines the duration of time to replay the multimedia content stream from the replay location. In one example, the duration of time to replay the multimedia content stream may be pre-determined by the replay location marking engine 44. The multimedia content stream with one or more replay locations is then provided to one or more users at processing devices 30A, 30B . . . 30X.

In one embodiment, replay location marking engine 44 marks the multimedia content steam with the replay locations in real time, while the multimedia content stream is provided to the users, by embedding information about the replay locations into a metadata stream associated with the multimedia content stream. For example, information about a replay location may include information about the event, the time of occurrence of the event, the point of interest related to the event, the time of occurrence of the point of interest, the start time of the replay location and the duration of time to replay the multimedia content stream from the replay location. In one example, the metadata stream associated with a multimedia content stream may be implemented as a configuration file such as an Extensible Markup Language (XML) configuration file. An exemplary illustration of a data structure of a configuration file associated with a metadata stream is illustrated below.

```
<MMContentDesc>
<Title> Football Game </Title>
<VideoFormat> MPEG </VideoFormat>
<ReplayLocation-1>
    <EventType>Touchdown </EventType>
    <EventTimeOfOccurence>14:15:00</EventTimeOfOccurence>
    <EventPointOfInterest > Recognized player enters game
</EventPointOfInterest>
    <EventInfo> Recognized player's entry followed by touchdown
</EventInfo>
    <EventReplayLocation> 14:10:00 </EventReplayLocation>
    <EventReplayDuration>0:00:45 </EventReplayDuration>
</ReplayLocation-1>
<ReplayLocation-2>
    <EventType>Touchdown</EventType>
    <EventTimeOfOccurence>14:30:45</EventTimeOfOccurence>
    <EventPointOfInterest> None </EventPointOfInterest>
    <EventInfo> 80 out of 100 users who are currently watching
the game rewound to this point to re-watch the touchdown </EventInfo>
    <EventReplayLocation> 14:30:45 </EventReplayLocation>
    <EventDuration>0:00:45 </EventDuration>
</ReplayLocation-2>
</MMContentDesc>
```

The configuration file illustrated above describes an exemplary metadata stream associated with a "Football Game". "MMContentDesc" is a tag that describes the multimedia content stream, "Title" is a tag that describes the title field in the multimedia content stream, and "VideoFormat" is a tag that describes the video format of the multimedia content stream. The tags, Title, VideoFormat, represent general information about the multimedia content stream and may be specified by the content provider 38, prior to providing the multimedia content stream to the centralized multimedia content streaming service 34 or to the processing devices 30A, 30B . . . 30X. It is to be appreciated that any number and type of tags representing general information about the multimedia content stream may be specified in the metadata stream, in other embodiments.

"ReplayLocation-1" and "ReplayLocation-2" describe information about replay locations in the multimedia content stream that are embedded into the metadata stream by the replay location marking engine 44. In one embodiment, "ReplayLocation-1" and "ReplayLocation-2" represent configurable parameters in the metadata stream that include tags that describe the type of the event (EventType), information about the event (EventInfo), the time of occurrence of the event (EventTimeOfOccurence), information about the point of interest related to the identified event (EventPointOfInterest), the start time of the replay location (EventReplayLocation) and the duration of time to replay the multimedia content stream from the replay location (EventDuration).

"ReplayLocation-1" includes information about a replay location determined based on the identification of a "Touchdown" event at time 14:15:00 in the multimedia content stream. In the illustrated example, replay location marking engine 44 determines that the "Touchdown" event at 14:15:00 relates to a point of interest related to the event, such as a recognized player's entry into the game that occurred at a prior time, 14:10:00 in the multimedia content stream and determines the time of occurrence of the point of interest as a replay location in the multimedia content stream. "ReplayLocation-2" includes information about a replay location determined based on the identification of a "Touchdown" event at time 14:30:45 in the multimedia content stream. In the illustrated example, multimedia content replay location marking engine 44 determines the time of occurrence of the "Touchdown" event as the replay location in the multimedia content stream. It is to be appreciated that any number and type of the replay location tags may be specified in the metadata stream, in other embodiments.

A multimedia content stream time-stamped or marked with one or more replay locations determined as discussed above is provided to one or more users at processing devices 30A, 30B . . . 30X, in real time. A user at processing devices 30A, 30B . . . 30X may re-watch an event from any one of the replay locations by invoking an option via a user interface in processing devices 30A, 30B . . . 30X. A segment of the multimedia content stream is replayed to the user, via the user interface. The manner in which a user may interact with a user interface in processing devices 30A, 30B . . . 30X to replay portions of the multimedia content stream to re-watch an event is discussed in detail in FIGS. 9-10.

In another approach and as discussed above, the identification of events and the intelligent determination of replay locations based on the identified events in the multimedia content stream may also be performed manually by a production person 17 who may be part of the current or live broadcast at the centralized multimedia content streaming service 34 or at the media provider 38. In one embodiment, the production person 17 may manually analyze information such as audio or visual cues in the multimedia content stream to identify one or more events in the multimedia content stream. The production person may also receive user-feedback information from one or more users at processing devices 30A, 30B . . . 30X as discussed above to identify one or more events in the multimedia content stream. The production person 12 may then manually mark the multimedia content stream with the one or more replay locations based on the identified events, for example based on either the time of occurrence of the identified event or based on a time of occurrence of a point of interest related to the identified event as discussed above. The multimedia content stream with one or more replay locations determined by the production person 12 may then be directly provided to the users at processing devices 30A, 30B . . . 30X via the media provider 12 or via the centralized multimedia content streaming service 34.

Figure 3:
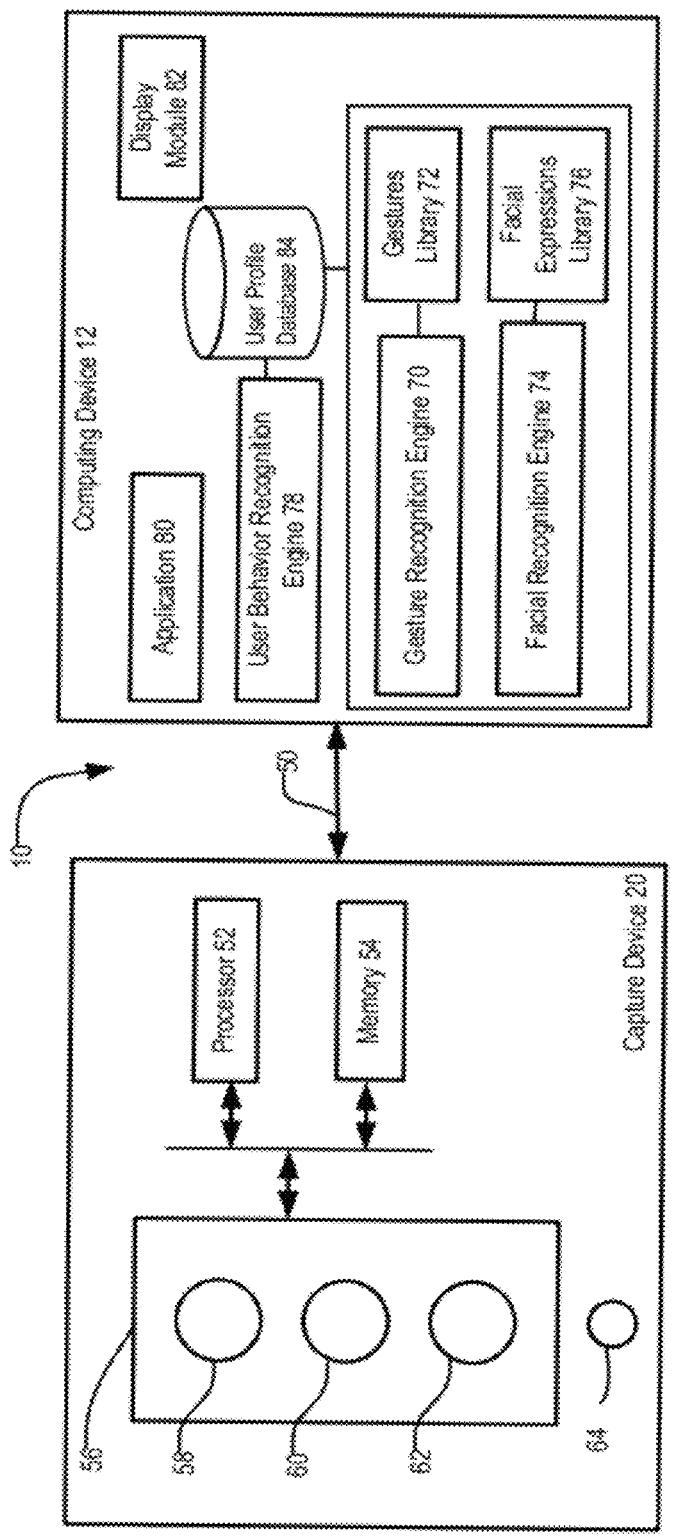
FIG. 3 illustrates one embodiment of a processing device that may be utilized in the present technology.

FIG. 3 illustrates one embodiment of a processing device that may be utilized in the present technology. In one example, the processing device may be a computing device 12 in the target recognition, analysis and tracking system 10. In one embodiment, computing device 12 includes a capture device 20 to recognize human and non-human targets in a capture area and uniquely identify them and track them in three dimensional space. Capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z-axis extending from the depth camera along its line of sight.

As shown in FIG. 3, the capture device 20 may include an image camera component 56. According to one embodiment, the image camera component 56 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 3, the image camera component 56 may include an IR light component 58, a three-dimensional (3-D) camera 60, and an RGB camera 62 that may be used to capture the depth image of a capture area. For example, in time-of-flight analysis, the IR light component 58 of the capture device 20 may emit an infrared light onto the capture area and may then use sensors to detect the backscattered light from the surface of one or more targets and objects in the capture area using, for example, the 3-D camera 60 and/or the RGB camera 62. In some embodiments, pulsed infrared light may be used such that the time between an outgoing light pulse and a corresponding incoming light pulse may be measured and used to determine a physical distance from the capture device 20 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects.

According to one embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example, the capture device 20 may use structured light to capture depth information. In such an analysis, patterned light (i.e., light displayed as a known pattern such as grid pattern or a stripe pattern) may be projected onto the capture area via, for example, the IR light component 58. Upon striking the surface of one or more targets or objects in the capture area, the pattern may become deformed in response. Such a deformation of the pattern may be captured by, for example, the 3-D camera 60 and/or the RGB camera 62 and may then be analyzed to determine a physical distance from the capture device to a particular location on the targets or objects.

According to one embodiment, the capture device 20 may include two or more physically separated cameras that may view a capture area from different angles, to obtain visual stereo data that may be resolved to generate depth information. Other types of depth image sensors can also be used to create a depth image.

The capture device 20 may further include a microphone 64. The microphone 64 may include a transducer or sensor that may receive and convert sound into an electrical signal. According to one embodiment, the microphone 64 may be used to reduce feedback between the capture device 20 and the computing device 12 in the target recognition, analysis and tracking system 10. Additionally, the microphone 64 may be used to receive audio signals that may also be provided by the user to control an application 80 such as a game application or a non-game application, or the like that may be executed by the computing device 12.

In one embodiment, capture device 20 may further include a processor 52 that may be in operative communication with the image camera component 56. The processor 52 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction.

The capture device 20 may further include a memory component 54 that may store the instructions that may be executed by the processor 52, images or frames of images captured by the 3-D camera or RGB camera, user profiles or any other suitable information, images, or the like. According to one example, the memory component 54 may include random access memory (RAM), read only memory (ROM), cache, Flash memory, a hard disk, or any other suitable storage component. As shown in FIG. 2, the memory component 54 may be a separate component in communication with the image capture component 56 and the processor 52. In another embodiment, the memory component 54 may be integrated into the processor 52 and/or the image capture component 56. In one embodiment, some or all of the components 56, 58, 60, 62, 46, 52 and 54 of the capture device 20 illustrated in FIG. 2 are housed in a single housing.

The capture device 20 may be in communication with the computing device 12 via a communication link 50. The communication link 50 may be a wired connection including, for example, a USB connection, a Firewire connection, an Ethernet cable connection, or the like and/or a wireless connection such as a wireless 802.11b, g, a, or n connection. The computing device 12 may provide a clock to the capture device 20 that may be used to determine when to capture, for example, a scene via the communication link 50.

The capture device 20 may provide the depth information and images captured by, for example, the 3-D (or depth) camera 60 and/or the RGB camera 62, including a skeletal model that may be generated by the capture device 20, to the computing device 12 via the communication link 50. The computing device 12 may then use the skeletal model, depth information and captured images to control an application 80 such as a game application or a non-game application, or the like that may be executed by the computing device 12.

In one embodiment, capture device 20 may automatically track a user's emotional response to multimedia content being viewed by the user by detecting the user's facial expressions and/or vocal responses. In one example, capture device 20 may detect facial expressions and/or vocal responses such as smiles, laughter, cries, frowns, yawns or applauses from the user. In one embodiment, facial recognition engine 74 in the computing device 12 may identify facial expressions performed by a user by comparing the data captured by the cameras 60, 62 (e.g., depth camera and/or visual camera) in the capture device 20 to one or more facial expression filters in a facial expressions library 76 in the facial recognition engine 74. Facial expressions library 76 may include a collection of facial expression filters, each comprising information concerning a user's facial expression. In another example, facial recognition engine 74 may also compare the data captured by the microphone 64 in the capture device 20 to the facial expression filters in the facial expressions library 76 to identify one or more vocal responses, such as, for example, sounds of laughter or applause associated with a facial expression.

In one embodiment, capture device 20 may also track a user's emotional response to the multimedia content being viewed by tracking the user's gestures and movements. In one example, movements tracked by the capture device may include detecting if a user moves away from the field of view of the capture device 20 or stays within the field of view of the capture device 20 while viewing the multimedia content. Gestures tracked by the capture device 10 may include detecting a user's posture while viewing the multimedia program such as, if the user turns away from the audio visual device 16, faces the audio visual device 16 or leans forward or talks to the display device (e.g., by mimicking motions associated with an activity displayed by the multimedia content) while viewing the multimedia content. In one embodiment, gesture recognition engine 70 in the computing device 12 may identify gestures and movements performed by a user by comparing the data captured by the cameras 60, 62 (e.g., depth camera and/or visual camera) in the capture device 20 to one or more gesture filters in a gestures library 72 in the gesture recognition engine 70. Gestures library 72 may include a collection of gesture filters, each comprising information concerning a user's gesture or movement. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated by reference herein in their entirety.

In one embodiment, computing device 12 also includes a user behavior recognition engine 78. User behavior recognition engine 78 tracks a user's viewing behavior while viewing multimedia content via the audiovisual device 16 in the computing device 12. Viewing behavior may include, for example, a list of controls such as a pause, forward, rewind, jump or a stop action that may be performed by a user while viewing multimedia content via the audiovisual device 16.

In one embodiment, computing device 12 provides information about the user's emotional response including the user's facial expressions, vocal responses, gestures, movements and information about the user's viewing behavior to the centralized multimedia content streaming service 34 for analysis. The centralized multimedia content streaming service 34 may utilize this information to identity events and perform the intelligent determination of replay locations based on the identified events in the multimedia content stream as discussed in FIG. 2 above.

The user's facial expressions, vocal responses, movements, gestures and the user's viewing behavior may be stored in a user profile database 84, in one embodiment. In one example, the tracking and identification of a user's facial expressions, vocal responses, movements and gestures may be performed at pre-programmed intervals of time, while the user views the multimedia content. The pre-programmed intervals of time may be determined by the computing device 12. It is to be appreciated that the tracking and identification of a user's facial expressions, movements and gestures at pre-programmed intervals of time enables the determination of the user's emotional response to the viewed multimedia content at different points in time. In one embodiment, the disclosed technology may provide a mechanism by which a user's privacy concerns are met while interacting with the target recognition and analysis system 10. In one example, an opt-in by the user to the tracking of the user's facial expressions, movements, gestures and the user's viewing behavior while the user views multimedia content is obtained from the user before implementing the disclosed technology.

Display module 82 in the computing device 12 displays the multimedia content stream to a user via the audiovisual device 16. In one embodiment, display module 82 replays a portion of the multimedia content stream to the user when the user invokes an option via a user interface in the audiovisual device 16. The manner in which a user may interact with a user interface in the audiovisual device 16 to replay a portion of the multimedia content stream is discussed in detail in FIGS. 9-10.

Figure 4:
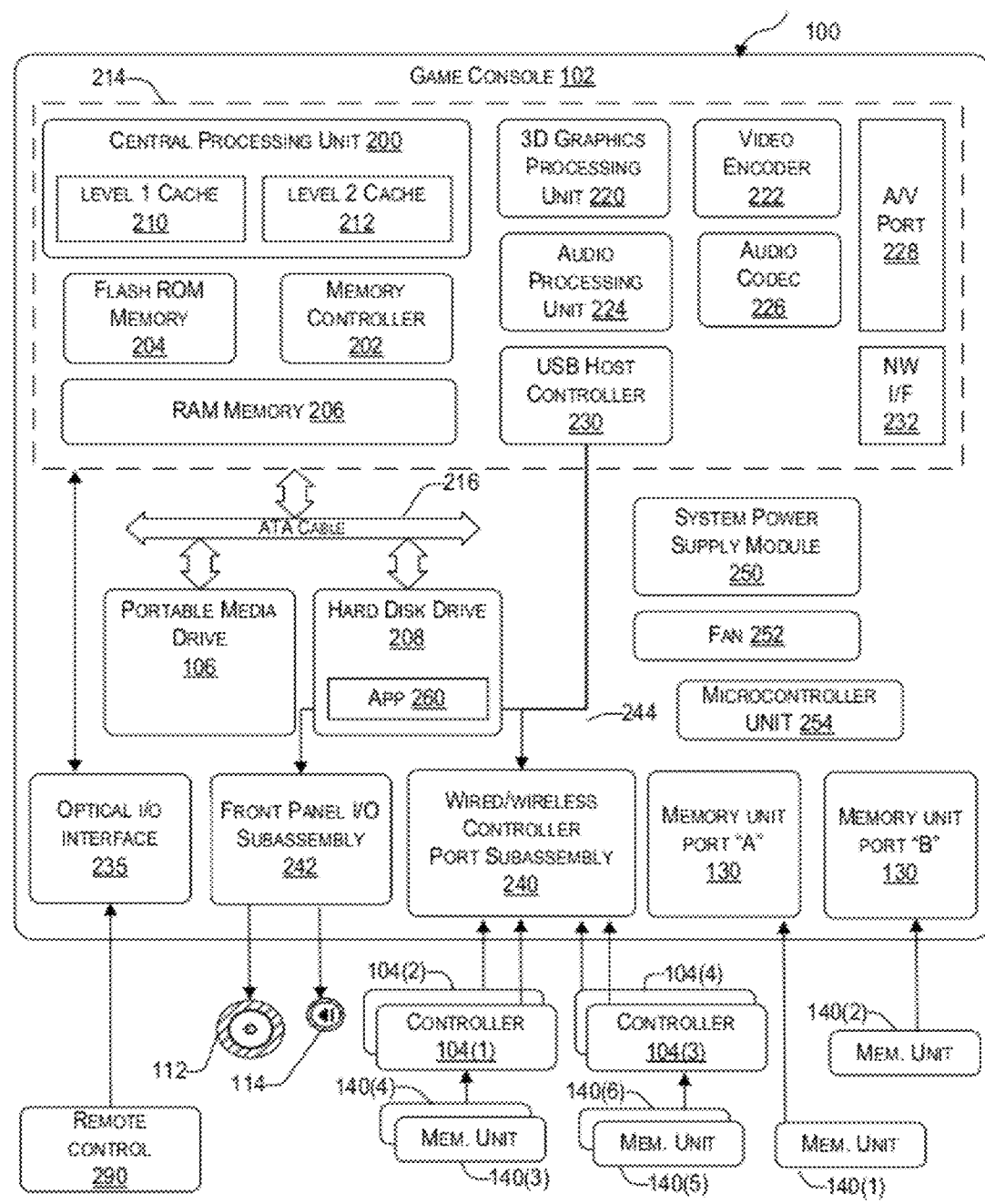
FIG. 4 illustrates an example of a computing device that may be used to implement the computing device of FIG. 3.

FIG. 4 illustrates an example of a computing device 100 that may be used to implement the computing device 12 of FIG. 3. In one embodiment, the computing device 100 of FIG. 4 may be a multimedia console 100, such as a gaming console. As shown in FIG. 4, the multimedia console 100 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 4 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 4, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202. A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to an audiovisual device 16 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community.

Figure 5:
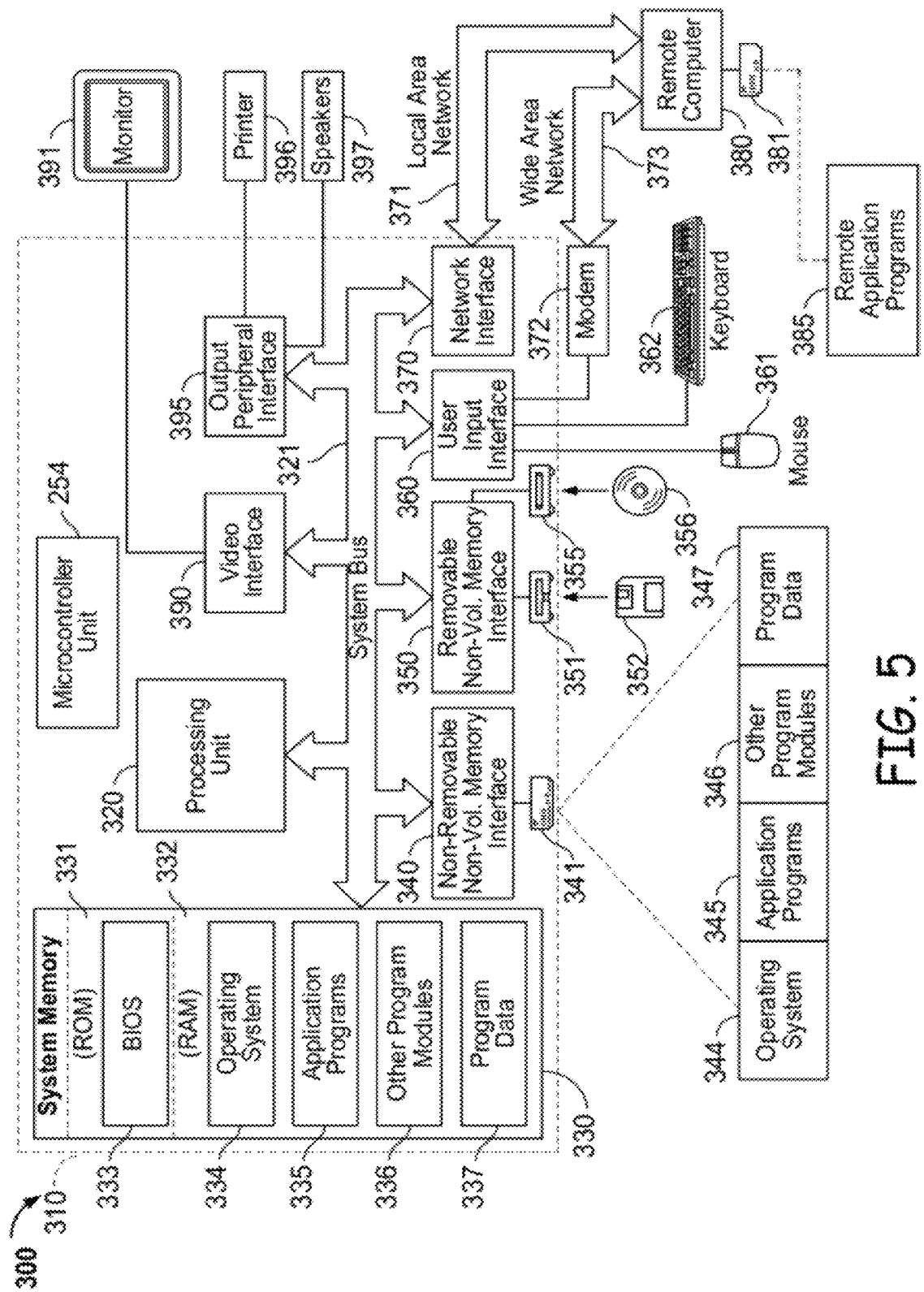
FIG. 5 illustrates a general purpose computing device which can be used to implement another embodiment of the computing device of FIG. 3.

FIG. 5 illustrates a general purpose computing device which can be used to implement another embodiment of computing device 12. With reference to FIG. 5, an exemplary system for implementing embodiments of the disclosed technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 5 illustrates operating system 334, application programs 335, other program modules 336, and program data 337.

The computer 310 may also include other removable/non-removable, volatile/nonvolatile computer storage media. By way of example only, FIG. 5 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 5, provide storage of computer readable instructions, data structures, program modules and other data for the computer 310. In FIG. 5, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 5. The logical connections depicted in FIG. 5 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 5 illustrates remote application programs 385 as residing on memory device 381. It will be appreciated that the network connections shown are exemplary and other means of establishing a communications link between the computers may be used.

Figure 6:
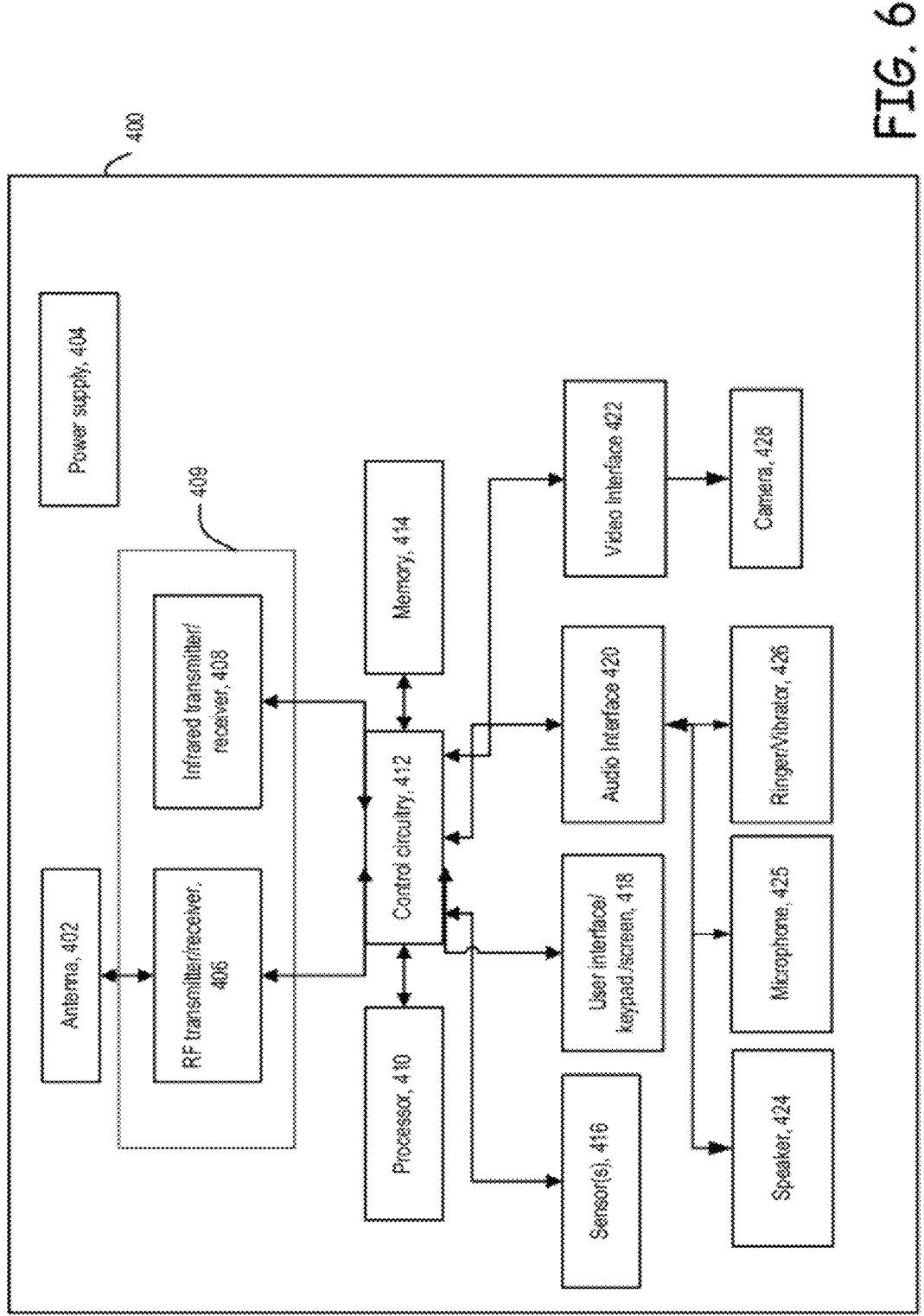
FIG. 6 illustrates another embodiment of the computing device for implementing the operations of the disclosed technology.

FIG. 6 illustrates another embodiment of the computing device for implementing the operations of the disclosed technology. In one embodiment, the computing device may be a mobile computing device, which may include, but is not limited to, a cell phone, a web-enabled smart phone, a personal digital assistant, a palmtop computer, a laptop computer or any similar device which communicates via wireless signals. As shown in FIG. 6, a system 400 implementing a mobile computing device may include control circuitry 412 that may include one or more processors 410, and storage or memory 414, such as, for example, non-volatile memory such as ROM and volatile memory such as RAM. Memory 414 stores processor-readable code which is executed by one or more of the processors 410 of the control circuitry 412 to implement the operations of the disclosed technology. One or more application programs may be loaded into memory 414, such as phone dialer programs, e-mail programs, PIM (personal information management) programs, internet browser applications, video game applications and so forth.

The control circuitry 412 may include a communication interface 409 that controls the transmission and reception of signals between the mobile computing device and other devices wirelessly or via a wired connection. As illustrated, in one embodiment, communication interface 409 may include Radio Frequency (RF) transmit/receive circuitry 406 and/or Infrared transmit/receive circuitry 408 for the transmission and reception of wireless signals. During a transmission mode, the control circuitry 412 may provide voice and other data signals to the transmit/receive circuitry 406. The transmit/receive circuitry 406 may transmit the signal to a remote station (e.g., a fixed station, operator, other mobile computing devices, etc.) via antenna 402.

Control circuitry 412 may also communicate with one or more sensor(s) 416, a user interface/keypad screen 418, an audio interface 420 and a video interface 422. The sensor(s) 416 may include, for example, motion detection sensors such as accelerometers, pressure sensors, proximity sensors, capacitive touch sensors and the like. Accelerometers have been incorporated into mobile devices to enable applications such as intelligent user interfaces that let users input commands through gestures, indoor GPS functionality which calculates the movement and direction of the mobile device after contact is broken with a GPS satellite, and to detect the orientation of the device and automatically change the display from portrait to landscape when the mobile device is rotated. An accelerometer may be provided, e.g., by a micro-electromechanical system (MEMS) which is built onto a semiconductor chip. Acceleration direction, as well as orientation, vibration and shock can be sensed via the accelerometers.

The User Interface keypad/screen 418 may include a keypad such as a push button numeric dialing pad (such as on a typical telephone) or a multi-key keyboard (such as a conventional keyboard). The UI keypad/screen 418 may also be touch-sensitive and include a liquid crystal display (LCD) or any other type of display commonly used in mobile devices. Audio interface 420 may be used to provide audible signals to and receive audible signals from the user. Audio interface 420 may be coupled to a speaker 424, a microphone 425 and a ringer/vibrator 426. The ringer/vibrator 426 may be used to signal an incoming call, text message, calendar reminder, alarm clock reminder, or other notification to the user. The ringer/vibrator 426 can emit one or more ring tones which are selected by the user and/or tactile vibrations. During a receiving mode, the transmit/receive circuitry 406 receives a voice or other data signal from a remote station through the antenna 402. A received voice signal may be provided to the speaker 424 while other received data signals are also processed appropriately. The microphone 425 may include a transducer that may receive and convert sound into an electrical signal. The microphone 425 may also include a pressure sensor or an audio sensor to facilitate the sensing of user gestures and the control of notifications.

Video interface 422 may be used to provide video, images and other signals to users. Video interface 422 may also be used to receive video, images and other signals from camera 428. Camera 428 may be used to capture images and/or video that may be displayed on the user interface screen 418. Camera 428 may also include one or more depth sensors that may capture, sense or detect a user's actions or gestures in a field of view of the mobile computing device.

System 400 may include a power supply 404, which may be implemented as one or more batteries. Power supply 404 may further include an external power source, such as an AC adapter or a powered docking cradle that supplements or recharges the batteries. A mobile computing device implementing system 400 may have additional features or functionality. For example, the device may also include additional data storage devices (removable and/or non-removable) such as, magnetic disks, optical disks, or tape. Computer storage media may include volatile and nonvolatile, removable and non-removable media implemented in any method or technology for storage of information, such as computer readable instructions, data structures, program modules, or other data.

Figure 7:
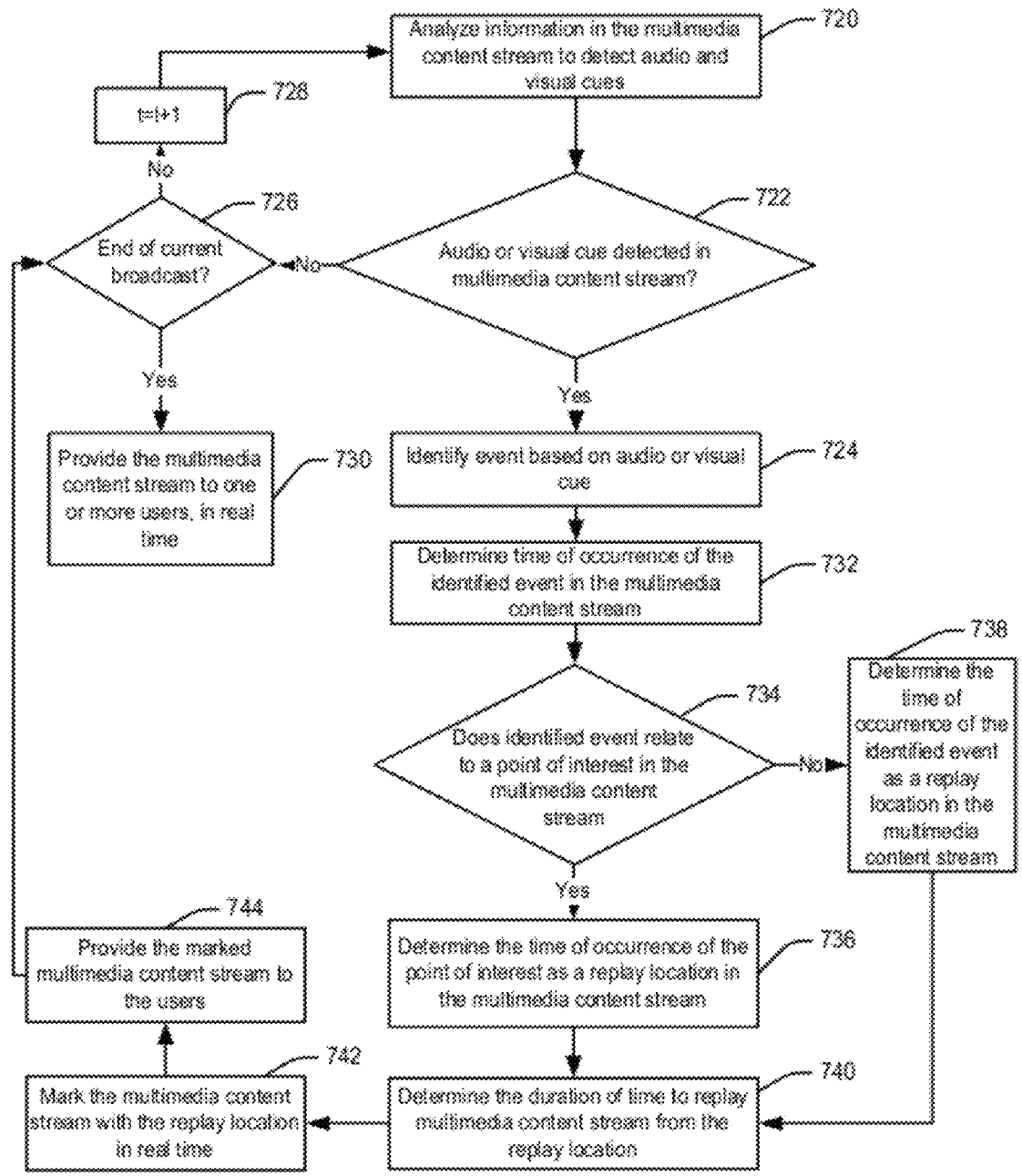
FIG. 7 describes one embodiment of a process by which a replay location in a multimedia content stream may be determined.

The hardware devices of FIGS. 1-6 discussed above can be used to implement a system that intelligently determines replay locations in a multimedia content stream by identifying events in the multimedia content stream. FIGS. 7 and 8 are flowcharts describing one embodiment of a process for performing the intelligent determination of replay locations in a multimedia content stream by identifying events in the multimedia content stream. In one embodiment, the steps of FIGS. 7 and 8 may be performed by software modules, for example, the event recognition engine 42 and the replay location marking engine 44 in the centralized multimedia content streaming service 34. FIG. 7 describes one embodiment of a process by which a replay location in a multimedia content stream may be determined (e.g., more details of step 24 of FIG. 2A). In step 720, information in the multimedia content stream is analyzed to detect audio or visual cues in the multimedia content stream. The cues may include, for example, applause, a cheer, a remark, a commentary update or a score update from one or more entities in an audio or video sequence in the multimedia content stream. In step 722, it is determined if an audio or a visual cue is detected in the multimedia content stream. If it is determined that an audio or a visual cue is detected, then an event based on the audio or visual cue is identified in the multimedia content stream at step 724. For example, events that may be identified based on audio or visual cues detected in a multimedia content stream corresponding to a football game may include touchdowns, runner downs, goals, free kicks and so forth.

In step 722, if it is determined that an audio or visual cue is not detected in the multimedia content stream, then it is determined if the current broadcast has ended in step 726. If the current broadcast has not yet ended, then the time t is incremented in step 728 and the analysis of the information in the multimedia content stream at the updated time t is performed as discussed in step 720. If the current broadcast has ended, then the multimedia content stream is provided to one or more users at processing devices, 30A, 30B . . . 30X, in real time, in step 730.

In step 732, the time of occurrence of the identified event in the multimedia content stream is determined. In step 734, it is determined if the identified event relates to a point of interest in the multimedia content stream. In one example, the point of interest may be identified by determining if the identified event was caused by a start of an activity or a start of motion at a prior point in time in the multimedia content stream. For example, an identified event, such as a "touchdown" may relate to a point of interest in the multimedia data stream where a recognized player enters the game.

If it is determined in step 734 that the identified event relates to a point of interest in the multimedia content stream, then the time of occurrence of the point of interest is determined to be a replay location in the multimedia content stream, in step 736. If it is determined that the identified event does not relate to a point of interest in the multimedia content stream, then the time of occurrence of the identified event is determined to be a replay location in the multimedia content stream, in step 738.

In step 740, the duration of time to replay the multimedia content stream from the replay location is determined. In one example, the duration of time to replay the multimedia content stream may be pre-determined to be in the range of about 45 seconds to about 120 seconds. In step 742, the multimedia content stream is marked with the replay location in real time by embedding information about the replay location into a metadata stream associated with the multimedia content stream. In step 744, the marked multimedia stream is provided to the users. FIG. 7 describes a process for determining a single replay location in a multimedia content stream. It will be appreciated that the process of FIG. 7 may be performed multiple times to determine multiple replay locations in the multimedia content stream although the determination of a single replay location is described in the particular example. In addition, the described process may be performed in parallel or in sequence to determine multiple replay locations in the multimedia content stream.

FIG. 8 describes another embodiment of a process by which a replay location in a multimedia content stream may be determined (e.g., more details of 24 of FIG. 2A). In step 750, user-feedback information is received from one or more users at processing devices 30A, 30B . . . 30X. As discussed in FIG. 2, user-feedback information may include information about a user's viewing behavior or information about a user's emotional response to the multimedia content viewed by the user. In step 752, it is determined if the user-feedback information from a threshold percentage of users corresponds to an event in the multimedia content stream. For example, if the user-feedback information from 100 users indicates that applause was received from 80% of the users during a specific time interval while viewing the multimedia content, then an event based on the user-feedback information is identified in the multimedia content stream at step 760. If it is determined that the user-feedback information from a threshold percentage of users does not correspond to an event in the multimedia content stream, then it is determined if the current broadcast has ended in step 754. If the current broadcast has not yet ended, then the time t is incremented in step 756 and the user-feedback information is received at the updated time t as discussed in step 720. If the current broadcast has ended, then the multimedia content stream is provided to one or more users at processing devices, 30A, 30B . . . 30X, in real time, in step 758.

In one embodiment, the process described in FIG. 8 may be performed in parallel with the process of identifying an event in the multimedia content stream based on analyzing information in the multimedia content stream (described in FIG. 7). In step 762, it is determined if the identified event (identified in step 760) already corresponds to an identified event with a marked replay location in the multimedia content stream (as determined by the process of FIG. 8). For example, if the identified event detected in step 760 corresponds to a touchdown event at a specific replay location in the multimedia content stream, it may be determined that the touchdown event has already been identified in the specific replay location in the multimedia content stream by analyzing the multimedia content stream (in step 724 of FIG. 8). If it is determined that the identified event already corresponds to a marked replay location in the multimedia content stream, then the marked multimedia content stream is provided to the users in step 776.

If it is determined that the identified event does not correspond to a marked replay location in the multimedia content stream, then the time of occurrence of the identified event in the multimedia content stream is determined in step 764. Steps (766-774) are similar to steps (734-744) discussed in FIG. 7. In step 766, it is determined if the identified event relates to a point of interest in the multimedia content stream. If it is determined in step 766 that the identified event relates to a point of interest in the multimedia content stream, then the time of occurrence of the point of interest is determined to be a replay location in the multimedia content stream, in step 770. If it is determined that the identified event does not relate to a point of interest in the multimedia content stream, then the time of occurrence of the identified event is determined to be a replay location in the content stream, in step 768. In step 772, the duration of time to replay the multimedia content stream from the replay location is determined. In step 774, the multimedia content stream is marked with the replay location in real time by embedding information about the replay location into a metadata stream associated with the multimedia content stream. In step 776, the marked multimedia stream is provided to the users.

Figure 9A:
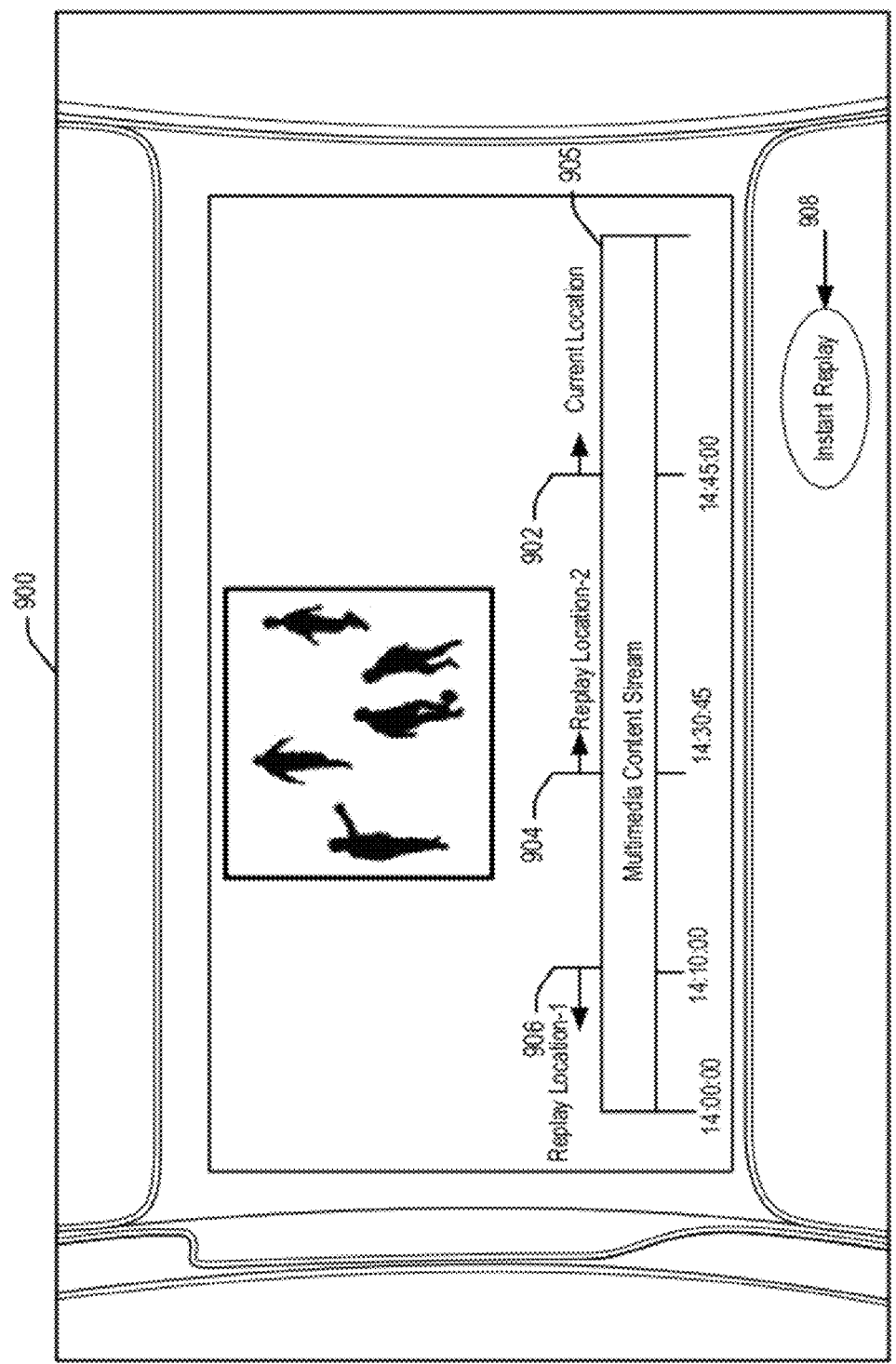
FIGS. 9-10 illustrate various display screens that allow a user to interact with the computing device discussed in FIG. 3, to perform one or more operations of the disclosed technology.

FIGS. 9-10 illustrate various user-interface screens that allow a user to interact with the computing device discussed in FIGS. 1-3, to perform one or more operations of the disclosed technology. In one embodiment, one or more users, such as users 18 and 19 (shown in FIG. 1) may interact with a user-interface screen 900 in the computing device 12 via the audiovisual device 16 connected to the computing device 12. FIG. 9A illustrates a multimedia content stream displayed to the user, via the user-interface screen 900. User-interface screen 900 also depicts a schematic view of the multimedia content stream 905 displayed to the user that is time-stamped or marked with one or more replay locations, Replay Location-1, 906 and Replay Location-2, 904 and the Current Location, 902. In one embodiment, and as described in FIG. 2, event recognition engine 42 and replay location marking engine 44 in the centralized multimedia content streaming service 34 perform the intelligent determination of replay locations in the multimedia content stream by identifying events in the multimedia data stream. Replay location marking engine 44 marks the multimedia content stream with the replay locations in real time, while the multimedia content is streamed to the user, by embedding information about the replay locations into a metadata stream associated with the multimedia content stream. As further illustrated in FIG. 9A, a user may re-watch one or more identified events in the multimedia content stream by selecting the "Instant Replay" option 908.

Figure 9B:
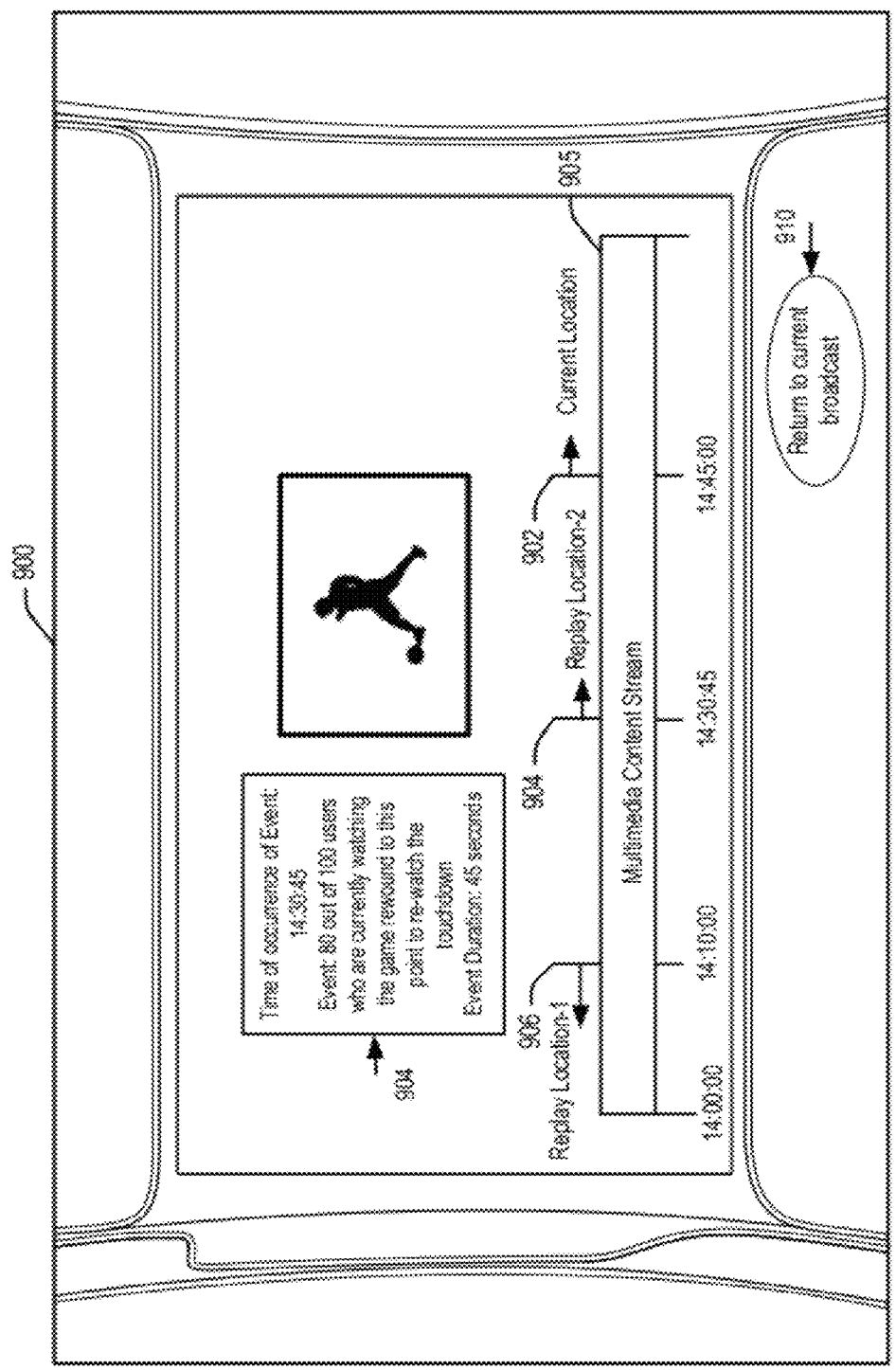

FIG. 9B illustrates a result of the user's interaction with the user-interface screen shown in FIG. 9A. In one embodiment, by selecting the "Instant Replay" option 908 (shown in FIG. 9A), the user is directly transported to the most recent replay location (i.e., Replay Location-2, 904) in the multimedia content stream 905, as illustrated in FIG. 9B. As further illustrated, the user is also provided with information about the replay location, 904. This information may include the time of occurrence of the event, a description of the event, and the duration of time that the user will watch the event. A user may return to watch the current broadcast by selecting the "Return to current broadcast" option, 910.

Figure 10A:
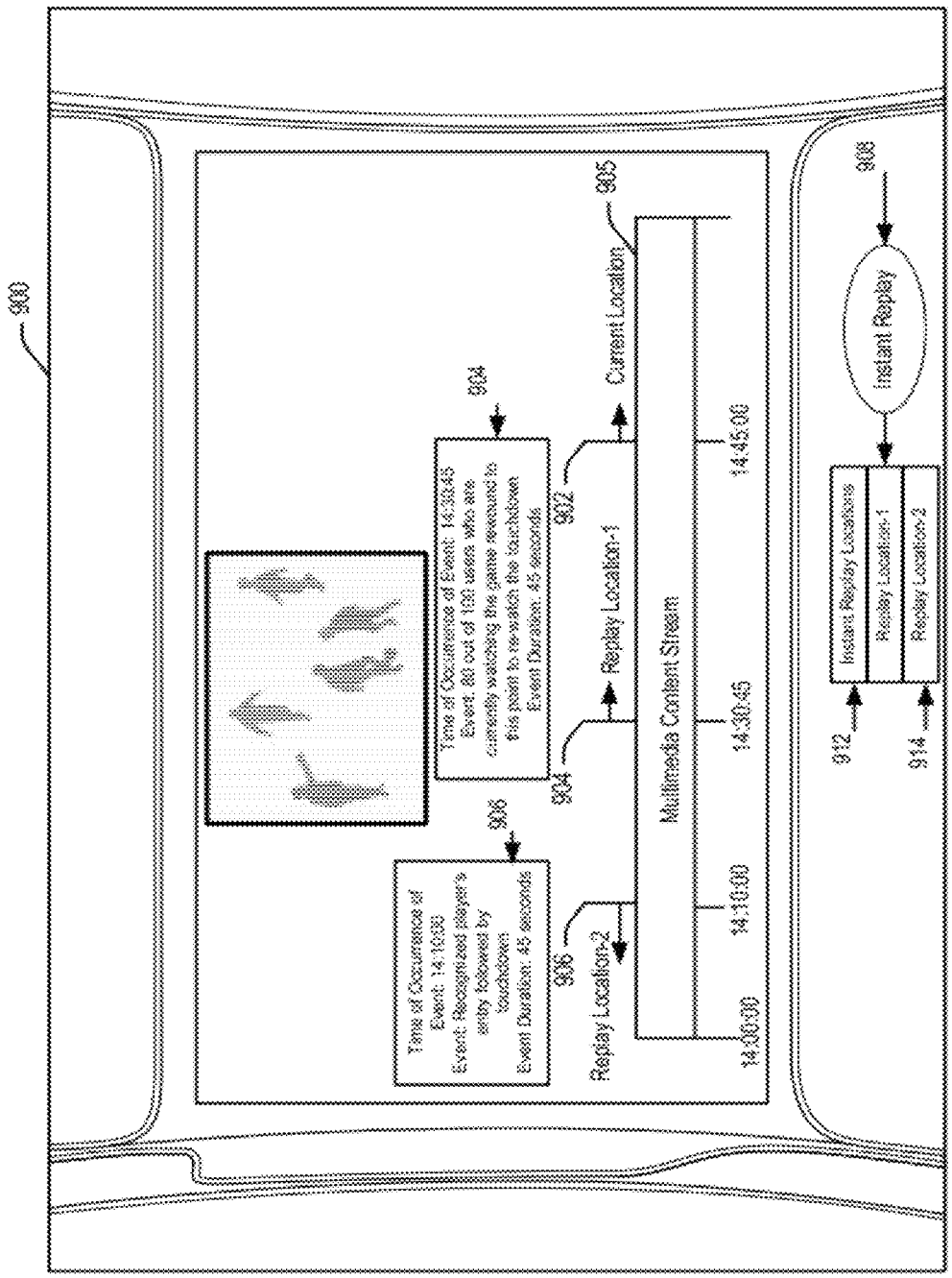
Figure 10B:
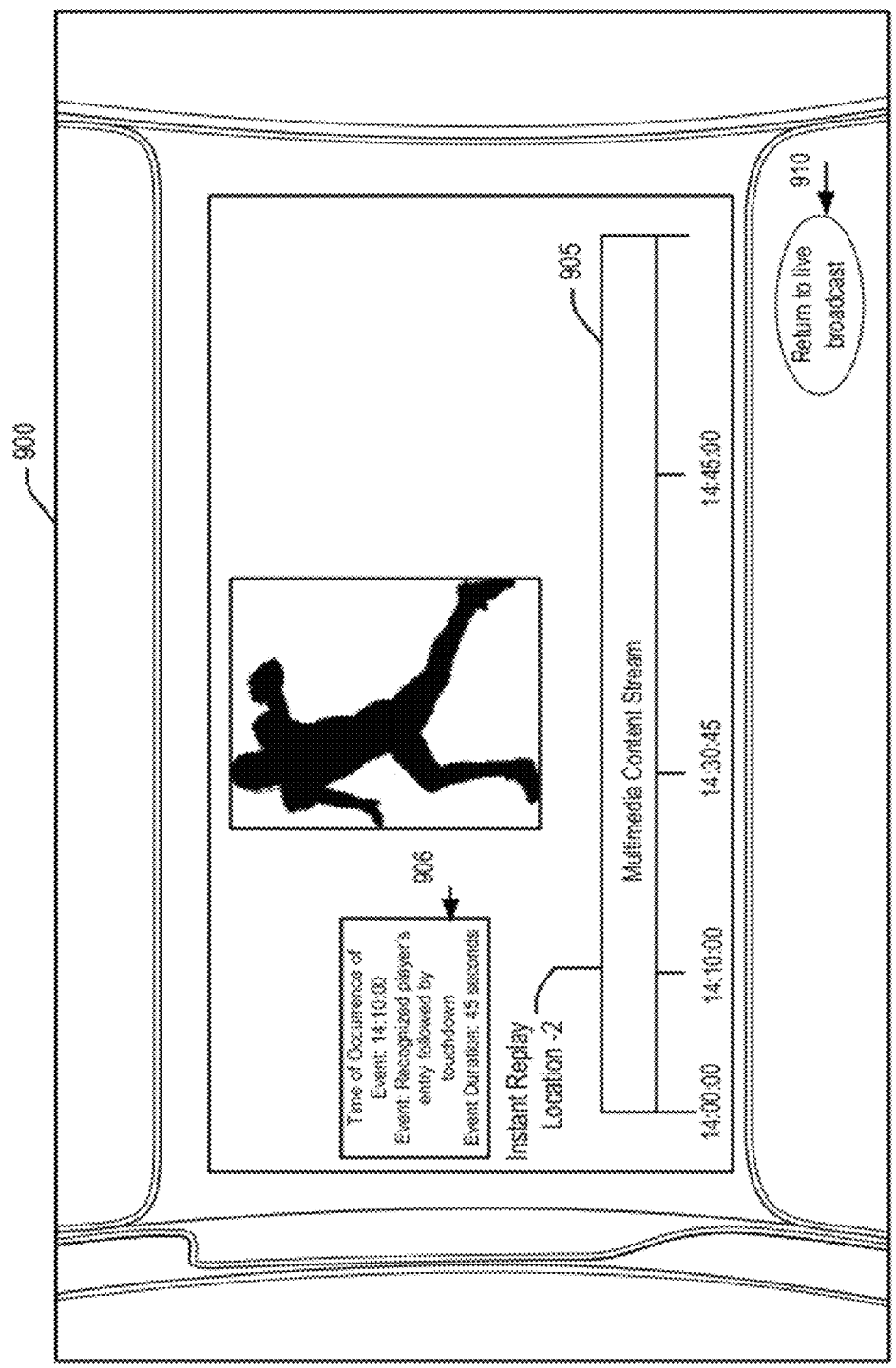

In another embodiment, and as illustrated in FIG. 10A, a user may be shown information about a list of replay locations, 912, in the multimedia content stream 905 when the user selects the "Instant Replay" option 908. The user may choose to view any of the replay locations by selecting one of the replay locations from the list, 912. In the illustrated example, a selection 914 by the user transports the user to Replay Location-2, 906, in the multimedia content stream 905, as illustrated in FIG. 10B. As further illustrated, the user is also provided with information about the replay location, 906. This information may include the time of occurrence of the event, a description of the event, and the duration of time that the user will watch the event. A user may return to watch the current broadcast by selecting the "Return to current broadcast" option, 910. In another embodiment, the user may be provided with a compressed view of events identified in the multimedia content stream when the user selects the "Instant Replay" option 908. For example, the user may be provided with the highlights of a sports game when the user selects the "Instant Replay" option 908, so that the user may just watch the highlights of the game without performing further interaction with the processing device. In addition, a user may also replay any of the replay locations, 902, 904 and 906 with voice, gestures and using on-screen controls.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A method for marking one or more content segments from a distributed multimedia content stream as replayable segments of interest, the method comprising:

identifying a multimedia content stream that has been distributed to, and has had at least part of its content played to a plurality of users who are not all local to one another and who are respectively monitored by respective ones of remote from one another and network connected capture devices;

receiving by way of a network and from the remote-from-one-another capture devices of a plurality of the monitored users, feedback information related to the identified multimedia content stream, the received feedback information indicating one or more of determined emotional responses and one or more of determined stream presentation control actions of the monitored users and timings of behaviors associated with those determined emotional responses and with those stream presentation control actions of the monitored users, wherein the stream presentation control actions of each respectively monitored user control how the identified multimedia content stream is presented to the respectively monitored user;

based on the received feedback information received way of the network and from the remote-from-one-another capture devices of the monitored users, using the indicated timings of the received feedback information to identify one or more segments in the content of the identified multimedia content stream corresponding to the one or more of the determined emotional responses and the one or more of the determined stream presentation control actions of the plurality of the monitored users; and based on the identifying of the one or more segments, generating a marked multimedia content stream having content of the identified multimedia content stream, the marked stream including marked and replayable content whose respective marking denotes the corresponding content as having at least one content segment corresponding to the detected one or more of the emotional responses and the one or more of the determined stream presentation control actions of the plurality of the monitored users; wherein:

the capture devices are configured to detect behaviors of their respective users and to determine therefrom a corresponding one or more of the emotional responses and stream control actions of their monitored users;

the capture devices are configured to respond to the stream presentation control actions of their monitored users by controlling at least one of time of playing to their respective users of content portions of the distributed and at least partly played multimedia content stream, including by means of play time control through rewinding and replaying of content, fast forwarding through content and stopping or pausing a playing of content;

the capture devices are further configured to provide identifying information about the respective content portion played to the respective users at the time of their respectively detected behaviors; and the identifying of the one or more segments based on the received feedback information comprises:

analyzing received user-feedback information related to play time control by the one or more users to thereby identify for the marking of the replayable content, that content which is related to one or more of a pause, forward, rewind, jump or a stop control behaviors detected by the capture devices.

2. The method of claim 1, wherein in addition to the identifying of the one or more segments based on the received feedback information, the method comprises identifying within the content of the obtained multimedia content stream at least one of imagery and audio present therein which can be designated as a within-stream event of possible interest and wherein the identifying of one of imagery and audio comprises:

detecting at least one of an audio cue or a visual cue in the obtained multimedia content stream to identify the corresponding event of possible interest.

3. The method of claim 2, wherein the audio cue or the visual cue comprises at least one of an applause, a cheer, a remark, a score update or a commentary update in the multimedia content stream.

4. The method of claim 1, wherein among the behaviors the capture devices are configured to detect for thereby determining one or more emotional responses of the one or more users to whom the multimedia content is played, are:
one or more of facial expressions, vocal responses, gestures, and movements performed by the respectively monitored users.

5. The method of claim 1, wherein the generating of the marked multimedia content stream comprises:
determining the time of occurrence within the marked multimedia content stream of a point of interest where the point of interest corresponds to a content segment associated with at least one of the detected emotional responses and detected stream presentation control actions, and
determining the duration of the point of interest or the type of the point of interest.

6. The method of claim 1, wherein the generating of the marked multimedia content stream comprises:
embedding into the marked multimedia content stream as metadata, information about the marked and replayable content.

7. The method of claim 6, wherein the embedded metadata information comprises:
information about one or more events of interest identified in the multimedia content stream, the time of occurrence of the one or more events, a point of interest related to the one or more events, the time of occurrence of the point of interest, a start time of a respective marked and replayable content portion and the duration of time to replay the respective marked and replayable content portion.

8. One or more processor readable storage devices having processor readable code embodied on said one or more processor readable storage devices, the processor readable code being configured to be read by the one or more processors, executed by the one or more processors and thus cause the one or more processors to perform a method comprising:
identifying a multimedia content stream that has been distributed to, and has had at least part of its content played to a plurality of users who are not all local to one another and who are respectively monitored by respective ones of remote from one another and network connected capture devices;
receiving by way of a network and from the remote from one another capture devices of a plurality of the monitored users, respective feedback information related to the identified multimedia content stream, the received feedback information indicating one or more of determined emotional responses and indicating one or more of determined stream presentation control actions of the respective monitored users and timings of the behaviors associated with those determined emotional responses and with those stream presentation control actions, wherein the latter stream presentation control actions of each respectively monitored user control how the identified multimedia content stream is presented to the respectively monitored user;
based on the received feedback information received way of the network and from the remote from one another capture devices of the monitored users, identifying one or more segments in the content of the identified multimedia content stream which correspond to the one or more determined emotional responses and to the one or more determined stream presentation control actions of the plurality of the monitored users; and
based on the identifying of the one or more segments, generating a marked multimedia content stream, the marked stream having content of the identified multimedia content stream including marked and replayable content portions whose respective marking denotes the corresponding content as having at least one content segment corresponding to the determined emotional responses and the determined stream presentation control actions of the plurality of the monitored users; wherein:
the capture devices are configured to detect behaviors of their respective users and to determine therefrom a corresponding one or more of the emotional responses and stream control actions of their monitored users;
the capture devices are configured to respond to the stream presentation control actions of their monitored users by controlling at least one of time of playing to their respective users of content portions of the distributed and at least partly played multimedia content stream, including by means of play time control through rewinding and replaying of content, fast forwarding through content and stopping or pausing a playing of content;
the capture devices are further configured to provide identifying information about the respective content portion played to the respective users at the time of their respectively detected behaviors; and
the identifying of the one or more segments based on the received feedback information comprises:
analyzing received user-feedback information related to play time control by the one or more users to thereby identify for the marking of the replayable content, that content which is related to one or more of a pause, forward, rewind, jump or a stop control behaviors detected by the capture devices.

9. One or more processor readable storage devices of claim 8, wherein the performed method further comprises:
receiving an input from the one or more users to replay the marked multimedia content stream; and
replaying one or more of the marked and replayable content portions whose respective markings denote the content portions as having at least one content segment corresponding to the detected emotional responses and stream presentation control actions.

10. One or more processor readable storage devices of claim 8, wherein the step in the performed method of identifying the one or more segments comprises:
determining if the one or more emotional responses and stream presentation control actions attributed to the monitored users are those from at least a predetermined threshold percentage of the monitored users.

11. An apparatus, comprising:
a computing device, including one or more processors and a memory accessible by the one or more processors, the computing device being communicatively coupled over a network to a plurality of respective capture devices, at least two of the capture devices being remote from one another;

the one or more processors of the computing device being configured to identify and obtain a multimedia content stream that has been distributed to, and has had at least part of its content played to a plurality of users who are monitored by respective ones of the capture devices;

the one or more processors of the computing device being further configured to identify, based on received feedback information from the capture devices whose users have had at least part of the content played to them, one or more segments in the content of the identified multimedia content stream which correspond to one or more determined emotional responses and to one or more determined stream presentation control actions of two or more monitored users, wherein the latter stream presentation control actions control how the identified multimedia content stream is respectively presented at respectively remote presentation locations to the respective and there monitored users; and the one or more processors of the computing device being further configured to generate a marked multimedia content stream having content of the identified multimedia content stream including marked and replayable content portions whose respective markings denote the content portions as having at least one content segment corresponding to the detected emotional responses and to the detected stream presentation control actions of the two or more monitored users; wherein: the capture devices are configured to detect behaviors of their respective users and to determine therefrom a corresponding one or more of the emotional responses and stream presentation control actions of their monitored users;

the capture devices are configured to respond to the stream presentation control actions of their monitored users by controlling at least one of time of playing to their respective users of content portions of the distributed and at least partly played multimedia content stream, including by means of play time control through rewinding and replaying of content, fast forwarding through content and stopping or pausing a playing of content;

the capture devices are further configured to provide identifying information about the respective content portion played to the respective users at the time of their respectively detected behaviors; and the identifying of the one or more segments based on the received feedback information comprises analyzing received user-feedback information related to play time control by the one or more users to thereby identify for the marking of the replayable content, that content which is related to one or more of a pause, forward, rewind, jump or a stop control behaviors detected by the capture devices.

* * * * *